US012573852B2

(12) United States Patent
Jha et al.

(10) Patent No.: US 12,573,852 B2
(45) Date of Patent: Mar. 10, 2026

(54) POWER MANAGEMENT OF ROADSIDE UNITS

(71) Applicant: Intel Corporation, Santa Clara, CA (US)

(72) Inventors: Satish Chandra Jha, Portland, OR (US); Kathiravetpillai Sivanesan, Portland, OR (US); Andradige Silva, Portland, OR (US); Suman A. Sehra, Folsom, CA (US); Leonardo Gomes Baltar, Munich (DE); S M Iftekharul Alam, Hillsboro, OR (US); Vesh Raj Sharma Banjade, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 17/709,924

(22) Filed: Mar. 31, 2022

(65) Prior Publication Data

US 2022/0224121 A1 Jul. 14, 2022

(51) Int. Cl.
*H02J 3/38* (2006.01)
*G05B 13/02* (2006.01)

(52) U.S. Cl.
CPC .......... *H02J 3/381* (2013.01); *G05B 13/0265* (2013.01); *H02J 2300/22* (2020.01); *H02J 2300/28* (2020.01)

(58) Field of Classification Search
CPC .... H02J 3/381; H02J 2300/22; H02J 2300/28; G05B 13/0265; G05B 13/027
See application file for complete search history.

(56) References Cited

U.S. PATENT DOCUMENTS

2008/0183337 A1* 7/2008 Szabados ............... H05B 47/18
                                                        700/90
2017/0174090 A1* 6/2017 Lakamp .................. B60L 53/52
2017/0270787 A1* 9/2017 Menard .................. G08B 25/10
2022/0114010 A1* 4/2022 Guim Bernat ...... G06F 9/45558

OTHER PUBLICATIONS

Choi, Sean, et al., "? NIC Interactive Serverless Compute on Programmable SmartNICs", [Online]. Retrieved from the Internet: <https://arxiv.org/abs/1909.11958>, (Sep. 26, 2019), 15 pages.

(Continued)

*Primary Examiner* — Charles Cai
(74) *Attorney, Agent, or Firm* — Schwegman Lundberg & Woessner, P.A.

(57) ABSTRACT

Systems and techniques for power management for a roadside unit (RSU) are described herein. In an example, a system may include a processor and memory coupled to the processor with instructions that cause the processor to receive multiple input factors. The multiple input factors corresponding an environmental condition at a location at which the RSU is located and at least one of a power saving preference for the RSU, a green energy usage preference for the RSU, a type of energy source available to the RSU, a quality of service requirement for the RSU, and a capability of the RSU. The processor may transmit a control packet, including parameters to control a mixture of green energy use by the RSU from a green energy power source and traditional energy use by the RSU from a traditional energy power source to the RSU.

24 Claims, 7 Drawing Sheets

(56) References Cited

OTHER PUBLICATIONS

Kidd, Taylor, "Power Management States P States, C States, and Package C States", [Online]. Retrieved from the Internet: <https://web.archive.org/web/20201112010810/https://software.intel.com/content/www/us/en/develop/articles/power-management-states-p-states-c-states-and-package-c-states.html>, (Apr. 17, 2014), 22 pages.

Liu, Ming, et al., "E3 energy efficient microservices on SmartNIC accelerated servers", Proceedings of the 2019 USENIX Conference on Usenix Annual Technical Conference (USENIX ATC '19), (2019), 17 pages.

Travers, Matthew, "CPU Power Consumption Experiments and Results Analysis of Intel i7 4820K", Newcastle University Technical Report Series NCL-EEE-MICRO-TR-2015-197, (Jun. 2015), 42 pages.

Wei, Qing, et al., "Energy Minimization for Infrastructure to Vehicle Communications with Multiple Roadside Units", 2019 11th International Conference on Wireless Communications and Signal Processing (WCSP). IEEE, 2019., (Oct. 23, 2019), 5 pages.

Zhang, Shan, et al., "Cost Effective Vehicular Network Planning with Cache-Enabled Green Roadside Units", IEEE ICC 2017 Next Generation Networking and Internet Symposium, (May 21, 2017), 6 pages.

* cited by examiner

POWER MANAGEMENT OF ROADSIDE UNITS

TECHNICAL FIELD

The present disclosure relates to power management of electronic roadside units.

BACKGROUND

Roadside units (RSUs) deployed in smart cities and intelligent transportation systems (ITS) provide always available sensing, communication, and processing/computation. A large number of RSUs may be deployed on road infrastructure and may be equipped with sensors (e.g., cameras, Light Detection and Ranging (LIDAR), Radio Detection and Ranging (RADAR), etc.), as well as compute/edge capabilities to sense the physical world in near real-time. Some RSUs may be connected to traditional power sources, such as a local power grid), and others may be connected to green energy sources such as wind or solar energy sources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
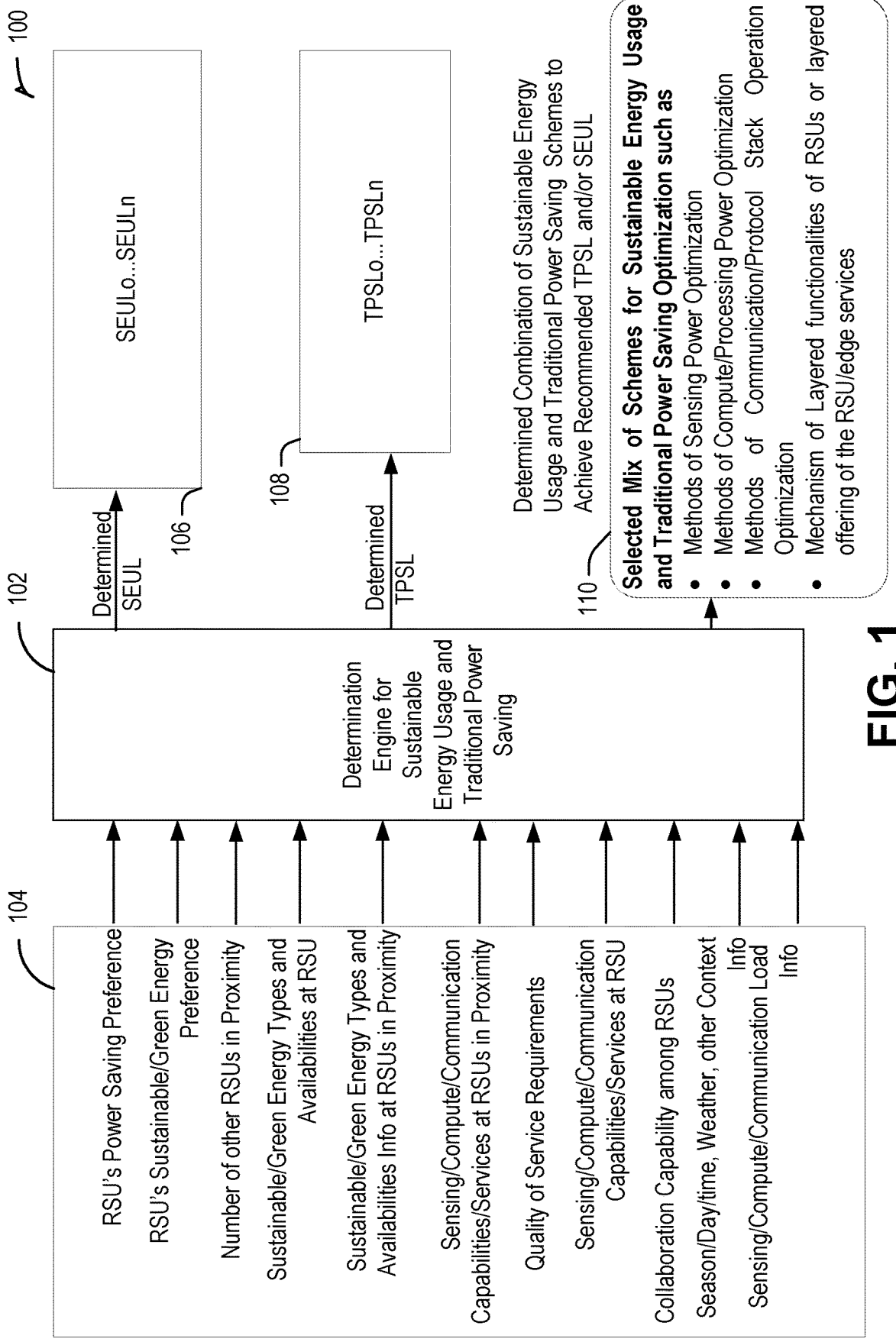
FIG. 1 illustrates an example of an intelligent determination model for sustainable energy usage and traditional power saving for an RSU.

As smart cities and intelligent transportation systems become more prevalent, there is a desire to make them more environmentally friendly. One way to do so is through the use of green/sustainable energy sources, such as wind and solar energy collectors that can be connected to the ITS infrastructure. The infrastructure may include roadside units (RSUs) that may provide always available sensing, processing/computation, and communication support. These RSUs may be equipped with one or more sensors such as cameras, LIDAR, RADAR, etc., as well as have edge/compute capabilities to sense the physical world in real-time or near real-time. Some RSUs may be connected to traditional power sources, such as a local power grid, while others may be connected to green energy sources, such as wind or solar generators. Some RSUs may be connected to both green energy sources and traditional energy sources and use the combination of both to perform their various functions.

RSUs may also need to communicate with other RSUs, cloud servers, and vehicles on the road. This may require one or more communication protocol stacks and/or radio access technologies (RATs) to run on the RSUs. These sensing, data processing, and communication operations consume various amounts of power. At peak/busy hours (e.g., during morning or evening "rush hours" on a weekday, before or after a professional sporting event, etc.) most of these operations may be needed at all the RSUs. During these peak hours, green energy usage can be maximized by an intelligent RSU power management mechanism/system. Further, road usage changes over time during the day (busy/peak hours vs non-busy/off-peak hours on a weekday), on weekends, or based on specific events in a region. During off-peak hours, RSU operations can be intelligently optimized to maximize green energy usage and minimize overall traditional/non-green power consumption. Hence, green energy usage and traditional power saving solutions to ensure sustainable power consumption are necessary for the millions of RSUs expected to be deployed in smart road networks and smart cities.

Some systems provide component solutions for RSU power saving in specific cases (e.g., compute specific or communication specific power optimization) but do not consider joint optimization for compute, communication, and sensing operations. Hence, they do not exploit the full potential of RSU power-saving. Due to the lack of joint considerations, these solutions may result into sub-optimal power saving strategies and lead the entire system to be in an undesired state, especially when individual power saving techniques conflict with each other. More importantly, these systems do not consider the underlying power source (traditional/non-green vs. sustainable/green) to maximize the overall sustainable energy usage.

Power saving of an individual RSU may be achieved by implementing a power saving scheme/schedule such as reducing power consumption for several operations at certain hours of the day. Making these power saving schemes aware of the underlying power source (traditional vs. green) may contribute to the overall goal of maximizing green energy usage. For example, in a particular scheme, sensing may be increased when green energy is available to power sensors, while sensing operations may be reduced, minimized, or even suspended completely when a green energy source is not available (e.g., when a device is using other energy sources, or when environmental conditions prevent the active use of green energy). Other schemes may include switching/transferring sensing or compute functions from one RSU to another/different RSU with available green energy sources, delaying compute functions until green energy sources are available at the RSU, or some combination thereof. Some applications running on or utilizing the RSUs may be governed by Service Level Agreements, (SLAs) or Quality of Service (QoS) requirements. Thus, a power management scheme of the RSU may need to be balanced against meeting an application's SLA, QoS requirements, or other similar factors. Thus, a determination of the proper mix of the green energy usage and traditional power saving schemes while jointly considering the availability of green energy sources and dynamic but heterogenous sensing/compute/communication workload at the RSU must be made. In this regard, building blocks/components in RSU architecture and mechanisms to optimize green energy usage and/or traditional power saving at an individual RSU while maintaining required Quality of Experience (QoE) levels, QoS levels, SLA requirements, or the like may be utilized. The system may report out results of implementing the power management scheme. The results may be reported out on a graphical user interface (GUI) or may be stored (e.g., in memory or in a database) locally or remotely for later retrieval and monitoring. For example, the system may determine that the power saving scheme resulted in a certain percentage of traditional power saving, and/or the scheme resulted in a certain amount of green energy being used by the RSU and whether the scheme was able to meet the green energy usage target and/or the traditional power saving target.

In some examples, collaboration among RSUs in some proximity to each other may provide further opportunities to reduce overall power consumption of a group of RSUs while maximizing the utilization of green power sources. Intelligent and collaborative situational networks that are aware of status and availability of green energy among proximity RSUs may be utilized. Such a collaborative situational network may use situational awareness information to maximize green energy in collaborative sensing, data processing, and data movement in the ITS infrastructure. For example, a Sustainable/Green Energy Usage Collaboration Group (SEUCG) can be formed at the Facility layer/Middleware among proximity RSUs (e.g., in the case of dense RSU deployment) whereby RSUs in a SEUCG share their resource and demand information such as CPU, accelerators, available sensors, Smart-NICS, storage, communication/compute demands, power source type(s), the availability status of the various types of power sources, caching, communication and compute requirements, operations in the network, etc. This may allow the RSUs making up the SEUCG to share resources so that functions that have a greater energy/power demand may be transferred to an RSU with available green energy sources, while functions with a lower/reduced energy demand may be performed on an RSU connected only to a traditional power source.

Disclosed herein is an architecture for RSUs to optimize green energy usage and traditional/non-green power saving with optional coordination with other RSUs or other roadside infrastructure. In an example, several green/sustainable energy usage levels (SEULs) and/or traditional power saving Levels (TPSLs) may be configured as green energy usage targets and/or traditional power saving targets for an RSU (or a group of collaborative RSUs). A machine-learning (ML)/artificial intelligence (AI) based algorithm may be utilized to dynamically or semi-statically determine SEULs and/or TPSLs for an RSU (or a group of collaborative RSUs) subject to maintaining target QoS, QoE, or SLA requirements for a Smart Transportation system.

The AI/ML-based algorithm may select a combination of proposed sustainable/green energy usage and traditional power saving optimization schemes/mechanisms to achieve desired SEUL and TPSL targets in an optimal way. Examples of green energy usage maximization schemes to achieve a SEUL target may include:

a. Increasing sensing when green energy is available to power sensors.

b. Minimizing sensing operations when green energy is not available (e.g., when a device is using other energy sources—as devices with green energy sources may also have alternate energy sources).

c. Switching/transferring sensing or compute operations to devices with available green energy sources.

d. Delaying sensing or compute operations until green energy sources are available while meeting an application's SLA requirements.

e. Enabling mechanism of layered functionalities of RSUs (e.g., layered offering of the edge services provided by RSUs) to continuously assess current or future green energy in the edge network and adopt layered offering of edge network services based on green energy status. For example, enabling more functionalities/services of the RSU when a green energy source is available, while reducing functionalities (e.g., only display speed limit, road signs, etc.) of the RSU when green energy is limited.

Examples of proposed traditional power saving schemes to achieve a TPSL target may include:

a. Shutting down/disabling one or more sensors.

b. Running one or more sensors in a low-power mode, such as at a reduced sensing rate.

c. Moving one or more processing cores to an idle state.

d. Running one or more CPUs at a lower frequency.

e. Offloading one or more microservices to low-powered processors in a Smart-NIC.

f. Moving a radio/modem/transmitter to an idle/sleep mode (with or without periodic awakening).

g. Implementing smart workload orchestration across heterogeneous processors (e.g., CPU, iGPU, VPU/HDDL, FPGA/HDDL, dGPU).

A system for power management for an RSU may include at least one processor, and memory, coupled to the at least one processor, configured to store instructions that, when executed by the at least one processor, cause the at least one processor to execute operations. The operations may comprise, receiving multiple input factors. The input factors corresponding to at least one environmental condition at a location at which the RSU is located and/or at least one of a power saving preference for the RSU, a quality of service (QoS) requirement, or a capability of the RSU. The capability of the RSU may include one or more operations capable of being performed by the RSU. The operations may further include transmitting a control packet to the RSU. The control packet including parameters to control a mixture of green energy use by the RSU from a green-energy power source and traditional energy use by the RSU from a traditional energy power source.

The green energy source may include at least one of a solar energy generator or a wind energy generator. The solar energy generator or the wind energy generator may be connected to the RSU independently from the power grid. The traditional power source may include mains power provided from an energy supplier over a power grid. Further, the traditional power source may be connected to the RSU via an indirect connection.

When the traditional power source is the only active power source connected to the RSU, a particular parameter of the parameters may be a power consumption reduction target. The power consumption reduction target may be a percentage reduction of an estimated maximum power consumption of the RSU. To achieve or progress toward the power consumption reduction target, the operations may further comprise at least one of powering off at least one component of the RSU, placing the at least one component into a low-power state, or disabling a particular operation of the one or more operations. The at least one component may be a sensor (e.g., a camera, a Light Detection and Ranging (LIDAR) device, or a Radio Detection and Ranging (RADAR) device). The powering off of the RSU, the placing of the RSU into a low-power state, or disabling the particular operation, may be done for a period of time determined by a machine-learning algorithm to meet or progress toward the power consumption reduction target.

When both of the green energy power source and the traditional power source are active and connected to the RSU, the parameters may include a green energy usage target. The green energy usage target may be a percentage of an estimated maximum power consumption of the RSU. To achieve the green energy usage target, the operations may further comprise monitoring an amount of green energy available from the green energy power source and activating at least one previously inactive component of the RSU.

In another embodiment, the operations may further comprise forming a collaborative group, the collaborative group including the RSU and a second RSU communicatively coupled to the RSU, determining a power-level demand for the RSU, and/or responsive to the determined power-level demand, transferring the at least one operation to the second RSU. In an example, the RSU and the second RSU may be configurable to transmit respective status information, the respective status information may include a current resource usage and at least one of: an available energy source type, a green-energy availability, an environment perception, a compute capability, a communication demand, or a compute demand. The respective status information may be transmitted in a message exchanged between the RSU and the second RSU. The current resource usage may include information regarding one or more sensors coupled to the RSU and one or more sensors coupled to the second RSU.

The information regarding the one or more sensors coupled to the RSU may include information about an energy source type connected to the one or more sensors coupled to the RSU. The information about the one or more sensors coupled to the second RSU may include information about an energy source type connected to the one or more sensors coupled to the second RSU. The information regarding the one or more sensors coupled to the RSU and the one or more sensors coupled to the second RSU may further include information about an availability of a low-power wake-up capability of the one or more sensors coupled to the RSU and the one or more sensors coupled to the second RSU.

Sensing Power Optimization

As discussed above, one or more of the sensors on an RSU may be disabled/shut down or put into a lower power mode to strive for or achieve a TPSL target. It may not be necessary to have all the sensors of an RSU continuously active. Activation or deactivation of the sensors may be driven by factors such as context information, green energy availability, and/or green energy demand. For example, sensing frequency may be increased at an RSU when green energy is available to power its sensors. Conversely, sensing frequency may be lowered or minimized when green energy is not available. That is, sensing frequency, and a sensor's configuration (e.g., field-of-view, coverage area, or the like) can be adopted or changed dynamically based on green energy availability (e.g., amount, expected time of availability, availability of green energy storage, etc.) and/or sensing demand.

Cameras connected to the RSU may be turned off at a particular time of day (e.g., at night) to save or conserve power, especially when the RSU is being powered by a traditional power source. Further, when an RSU has multiple cameras, cameras with green energy availability may be prioritized to remain on, while others are connected to a traditional power source may be turned off. For multi-camera deployment, a view importance estimator may be implemented to determine a subset of cameras (with overlapping views) that have better coverage for an object of interest on the road with a preference for using cameras connected to a green energy source. In such an example, a video analytics pipeline on the rest of the cameras can be turned off to save/conserve power. In an example, a sensor connected to a traditional power source may be operated with smaller duty cycles at times when road use is sparse (e.g., at night), or in areas where traffic is light (e.g., rural areas).

Green Energy Maximization

The system may employ several methods to attempt to maximize the use of green energy at the RSU. For example, compute functions/operations at an RSU attached to a green energy source may be selected with higher priority. QoS requirements may be considered in determining which operations to perform at the RSU, and what operations may be offloaded to the cloud, edge, another RSU, or the like. Other factors such as latency (compute offloading to an RSU powered by a green energy source may increase latency, increased communication latency for data exchange, and processing latency if a greener RSU has lower compute power) may also be considered when determining which operations to perform at the RSU.

Impact on QoS requirements may be tied to some criterion when determining whether to offload compute functions. For example, compute time or an amount of latency may be required to be below a certain amount of time (e.g., a threshold) in order for a compute operation to be offloaded from one RSU to another. Where use of an RSU powered by a green energy source increases latency above a QoS requirement threshold (e.g., a time to perform a compute operation), the system may perform the operation on an RSU powered by a traditional power source to keep the compute time below the requirement set by the QoS. In another example, compute or processing operations may be delayed until a green energy power source is available to be used, as long as an application's QoS or Service Level Agreement (SLA) requirements can be met.

Optimizing Green Energy Use and Traditional Power Saving

When an RSU has both a green energy source and a traditional power source actively connected to it (e.g., a wind or solar power source and a connection to a local power grid), several considerations may be considered to attempt to maximize the use of green energy and save/conserve the most traditional power as possible. For example, smart workload orchestration across multiple heterogenous processors (CPU, iGPU, VPU/HDDL, FPGA/HDDL, or dGPU) may be implemented based on factors such as real-time thermal demands of the processor material (e.g., Silicon) and/or outside environmental conditions. Many processors' Thermal Design Power (TDP) are calculated with a critical workload that may result in thermal gating if the processor is overloaded. Thus, passive thermal solutions may be implemented to protect the various processors, for example, use of workloads that operate with a TDP yield that a particular processor can endure.

Thermal performances in each processor may be determined based on various factors like type of workload, timing and sequence of compute events, type of compute operations being performed, throughput/latency/accuracy required, or the like. Further, the same workload on one processor may yield different thermal, throughput, latency, and accuracy performance than in another processor available in a heterogenous architecture. Thus, the system may determine which processor of those available on the RSU should perform which operations to meet that processor's thermal requirements or limitations. In an example, use of orchestration platforms like Kubernetes®, workloads (or parts of workloads) may be offloaded to different processors in the heterogenous hardware platform dynamically (e.g., in real-time) based on compute demand.

The RSU may be equipped with one or more temperature sensors to measure outside environment temperature, temperature of upstream air from other compute devices, or the temperature of the thermal enclosure. The temperature readings, along with temperature readings within the processors may be used to dynamically orchestrate workloads while factoring in the thermal limitations (along with energy source type, compute demand, scalability, or availability) at the RSU. Thus, the operating temperature of the processors may be extended beyond the range of what other thermal solutions allow. More operations may be offloaded in response to cooler ambient temperatures and fewer operations may be offloaded in warmer/hotter ambient temperatures to balance the workload across the various processors in the system.

The workload orchestration may be made intelligently either by using supervised or reinforcement learning (RL) by recording thermal outputs along with performance measures (e.g., throughput, latency, or accuracy) against different workloads. The system may learn which layers/kernels contribute to which level of thermal output when run with a given throughput/latency target and precision. As such, depending on the ambient conditions, the system may adaptively determine how to distribute the current workload across processors and what modifications to throughput/latency/accuracy should be made to meet the thermal demands and prevent thermal throttling.

Another method to preserve/conserve traditional power use may be to keep a limited number of cores on the processors running (e.g., by configuring multiple C-states or C-modes of the cores to put the cores into varying levels of idle/sleep states), or operating the processors (e.g., a CPU) at lower or reduced frequencies (e.g., by configuring different P-states of the cores to scale the frequency and/or voltage at which the cores run). The C-states and/or P-states may be implemented when compute demand on a given processor is reduced (e.g., during off-peak hours or when processing latency is relaxed) or when a green energy source is not available to power the processor. In an example, all the cores and associated circuitries may be shut down or placed into an idle state (e.g., by using C-states PC3, Deep C3, or PC6) when a compute load is not expected. The system may use an AI/ML model to predict computing load and implement the C-states or P-states based on the predicted load, keeping some of the CPU cores running while placing others into an idle state. This may allow the system to minimize power consumption while reducing the time required to transition the CPU (or the cores) from an idle state to an active state.

In an example, use of low-power processors in a Smart-NIC (smart network interface card) of RSUs and offloading edge microservices to the Smart-NIC while keeping CPU cores in a sleep state may be used to save power when the RSU is operating on power from a traditional power source. In such an example, the resource and performance requirement of microservices, current CPU load, CPU energy source type, networking/packet processing demand, desired green energy usage levels, and traditional power saving levels may be input into a determination engine (e.g., an AI/ML engine) and the engine may dynamically determine whether the microservices should be offloaded to Smart-NIC to minimize power consumption or maximize green energy usage while meeting performance needs. The output of this determination may be fed/transmitted to a controller that may install packet parsing rules into on-NIC storage so that incoming packets may be routed to locally configured microservices instead of being passed to the CPU cores. The packet parsing rules may be defined using a declarative language such as P4 and implemented on a P4-supported Smart-NIC.

Another power-saving scheme may include configuring a radio/modem/transmitter of the RSU to wake up with a periodic sleep cycle (e.g., a mechanism similar to 3GPP LTE/New Radio Interface Discontinuous Reception (NR DRX)). In such an example, when the RSU is acting as a time synchronization reference source, a sleep period small enough to ensure that time alignment is not impacted may be implemented. When Global Navigation Satellite System (GNSS) is providing time synchronization, GNSS may be kept running while radio/transmitter is idle. The AI/ML model may be used to predict the communication load necessary to meet various QoS requirements along with energy source type (green versus non-green/traditional) to dynamically or semi-statically select optimal periods of sleep cycles. In another example, a low-power sensor that may include on-device processing may sense/monitor the environment continuously when the transmitter is idle/asleep in order to predict a need wake up the transmitter. For example, when the sensor detects motion within the coverage of the RSU, it may send a signal to the system to wake up the transmitter. Alternately, the system may wake up the transmitter up based on sensing data indicated by sensor.

When an RSU is deployed on a roadside with only a green energy power supply (e.g., deployed in rural areas or out of town roads where connection to a power grid may not be a practical or cost-efficient solution) the RSU may be used for services such as displaying road signs (e.g., speed limit signs, mile markers, or the like). In such situations green energy availability may vary due to factors such as weather or time of day. When green energy is limited, these RSU may smartly apply green energy usage schemes to provide designated services for a longer period/duration. For example, these RSUs may move to an idle state with periodic awake times to disseminate information.

Intelligent Determination Model

A system for power management of an RSU may include an intelligent determination model. The model may utilize artificial intelligence/machine learning to evaluate multiple input factors. Input factors may correspond to one or more environmental conditions at the RSU's location. Input factors may also correspond to capabilities of the RSU. For example, whether the RSU is operating as a sign (such as a traffic sign) versus when the RSU is utilizing sensors to detect or map its environment. Input factors may also include how many and what capabilities other RSUs located in proximity to the RSU (e.g., within a certain distance of the RSU) have available, green energy availability and usage preference at the RSU, or the like. The input factors may be input into a determination engine, that, based on analysis of the input factors, may determine a Sustainable (Green) Energy Usage Level (SEUL), a Traditional Power Saving Level (TPSL), or a combination of green energy usage or traditional power saving for the RSU. In an example, the determination engine may use/consider the intent/intention of a service provider or a consumer of the services/data to determine a SEUL or TPSL for the RSU. For example, the determination engine may consider a green energy usage preference of an application running on the RSU, or a green energy usage preference in a QoS agreement. The determination engine may transmit a control packet to the RSU that includes parameters to control a mixture of green energy usage and/or traditional energy usage by the RSU.

Predicted demands for services along with their QoS requirements may be used along with context information (such as day of the week, time of the day, geographic area, month, season, weather conditions, long term demands learned over time, available coordination among proximity RSUs, energy availability and energy source types among proximity RSUs, and resources/services/capabilities available at RSUs, etc.) to dynamically or semi-statically determine optimal SEUL and/or TPSL for an RSU by using intelligent algorithms deployed at an artificial intelligence/machine learning AWL-based SEUL/TPSL determination engine. AWL-based algorithms may also be used to intelligently select one or more combinations of the power saving schemes to achieve target SEUL and/or TPSL for obtaining a closer to optimal solution than may be obtained by using traditional heuristic-based (non-ML) solutions. Moreover, the use of AI/ML-based intelligent selection schemes may be beneficial given the immense amount of training data available in a continuous/time evolved manner, thus leading to a more accurate and more robust model over time. It is understood that the term "engine" refers to a program (e.g., in operating systems, subsystems, or applications), a component, or series of components that perform core/essential functions (e.g., for other programs), and may use an algorithm (e.g., a deep learning algorithm) to query data and make a recommendation or a determination based on the queried data. The engine may be constructed/architected/implemented using fixed circuitry such as CPU cores or programmable circuitry such as a Field Programmable Gate Array (FPGA). The engine may be designed for an AI accelerator, an Infrastructure Processing Unit (IPU), a Data Processing Unit (DPU), a Network Processing Unit (NPU), or any component that performs specialized data processing.

FIG. 1 illustrates an example of an intelligent determination model 100 for sustainable energy usage and traditional power saving for an RSU. The intelligent recommendation model 100 may include a determination engine 102. The determination engine 102 may receive one or more input factors 104. The input factors 104 may include one or more of a power saving preference for the RSU, a green energy usage preference for the RSU, a green energy type and availability at the RSU, a Quality of Service (QoS) requirement, a sensing capability of the RSU, a compute capability of the RSU, a communication capability of the RSU, a number of other RSUs in proximity to the RSU, green energy types and availability of the other RSUs in proximity to the RSU, sensing/compute/communication capabilities of the other RSUs in proximity to the RSU, collaboration capabilities of the RSU and the other RSUs in proximity to the RSU, or sensing/compute/communication load information on the RSU and the other RSUs in proximity to the RSU. The load information may include current, real-time, or near-real-time usage load on the RSU or the other RSUs in proximity to the RSU. For example, the load information may include whether the RSU is currently sensing with an onboard sensor, or a sensor connected to the RSU, and how many processing or computing resources the load is using.

In an example, the one or more input factors 104 may include at least one environmental condition at a location at which the RSU is located. The environmental factors may include weather conditions (e.g., overcast, raining, snowing, amount of sunshine, etc.), the current season at the location of the RSU, time of day, or any other relevant or applicable factors/contextual information of the RSU's environment (or the environment of other RSUs in proximity to the RSU).

Based on an analysis of the one or more input factors 104 by the determination engine 102, the intelligent determination model 100 may determine an amount of green energy the RSU should use, how much traditional power should be saved by the RSU, or whether the RSU should implement a mixture of green energy usage from a green energy source and how much traditional energy from a traditional energy source available to the RSU should be used by the RSU. In an example, the determination may be a minimum amount of green energy usage or a minimum amount of traditional power saving that should be implemented by or at the RSU.

In an example the determination engine 102 may output a determined SEUL 106, a determined TPSL 108, or a determined combination SEUL and TPSL 110 to be employed by or implemented at the RSU. The determined SEUL 106 may be a percentage of an estimated maximum power consumption of the RSU. For example, the determined SEUL 106 may be defined in terms of the following levels:

$SEUL_0$—No Sustainable/Green Energy Usage target. $Y_0 = 0\%$ of the Green Energy Usage Target with respect to estimated maximum RSU power (sustainable/green+traditional) consumption. In other words, it means that green energy usage is not necessary or not feasible to be used by the RSU at the time, and all compute and communication components on the RSU are running/being power with a traditional energy source. For example, when an RSU has a solar power energy source connected to it, and the weather at the RSU's location is overcast, or the solar collector on the solar power source is not receiving enough sunlight to provide the RSU with the amount of energy required to perform a necessary function, the determination engine 102 may determine that green energy usage is not feasible, and that the RSU must be powered using a traditional power source.

$SEUL_1$—$Y_1 = 20\%$ of Sustainable/Green Energy Usage target with respect to estimated maximum RSU power consumption. The determination engine 102 may determine that the RSU can operate using green energy for 20% of its maximum overall power consumption. Again, this may be based on one or more of the one or more input factors 104, such as a type of green energy available to the RSU and environmental conditions in the location of the RSU.

$SEUL_2$—$Y_2 = 40\%$ of Sustainable/Green Energy Usage target with respect to estimated maximum RSU power consumption.

$SEUL_m$—$Y_m <= 100\%$ of Sustainable/Green Energy Usage target with respect to estimated maximum RSU power consumption. In this example, the determination engine 102 may determine that the RSU can operate on 100% green energy. In this case, no traditional power may be utilized by the RSU during its operation.

When the determination engine 102 determines that the RSU can operate on a percentage of green energy that falls between one of the SEULs, (e.g., the RSU can operate on 35% green energy), the RSU may only operate at $SEUL_1$ because it would not be able to operate at $SEUL_2$. It is understood that the system may employ any number of SEULs, which may correspond to a different percentage of green energy usage than what is listed above. However, it is understood that $Y_1 > Y_0$, $Y_2 > Y_1 > Y_0$, and $Y_m > \ldots Y_2 > Y_1 > Y_0$.

In an example, the determined TPSL 108 may be a power consumption reduction target that is a percentage reduction of an estimated maximum power consumption of the RSU. Like the determined SEUL 106, the determined TPSL 108 may be defined in terms of levels that correspond to a certain percentage of power saving. Non-limiting examples of the TPSLs may include:

$TPSL_0$—No Traditional/Non-green Power Saving target. $X_0$=0% of Traditional Power consumption reduction target with respect to estimated maximum RSU power consumption. In $TPSL_0$, traditional power saving may not be necessary or feasible (e.g., because none of the components of the RSU can be powered down while the RSU performs its operations), and the compute and/or communication components are run on a traditional energy source (e.g., because no green energy source is available for use).

$TPSL_1$—$X_1$=20% of Traditional power consumption reduction targets with respect to estimated maximum RSU power consumption.

$TPSL_2$—$X_2$=40% of Traditional Power consumption reduction targets with respect to estimated maximum RSU power consumption.

$TPSL_n$—$X_n$<=100% of Power consumption reduction target with respect to estimated maximum RSU power consumption.

In an example, in $TPSL_1$, $TPSL_2$, and $TPSL_n$ different percentages of the power from traditional sources can be reduced. This may be achieved by powering off at least one component of the RSU, placing a component of the RSU into a low-power state, or disabling a particular operation of the RSU. In the example of $TPSL_n$, in a case where Xn=100, the entire RSU may be powered down. For example, when an RSU is a digital sign, such as a road sign, that is located on a section of road that is closed or otherwise not open to traffic, the RSU may be turned off in order to save power or not use traditional power. Additionally, or alternatively, a scenario in which Xn=100, the RSU may be capable of running entirely on power from a green energy source, in which case a connection to a traditional power source may be disabled or otherwise turned off.

When the RSU is running on/operating with traditional/non-green energy, a combination of schemes may be selected to achieve the target TSPL. For example, the system may shut down selected sensors or run selected sensors in a low-power state and move selected cores to an idle state or run selected CPUs at a lower frequency. Additionally, or alternatively, the system may offload select microservices to low-powered processors in a Smart-NIC, place a radio, transmitter, or modem connected to the RSU in an idle/sleep mode (with or without a periodic wakening), and/or implement a smart workload orchestration across heterogeneous processors of the RSU (e.g., CPU, iGPU, VPU/HDDL, FPGA/HDDL, dGPU, etc.).

When both the green energy power source and the traditional energy power source are active and connected to the RSU, the determination engine 102 may determine that a combination of green energy may be used along with an energy provided by a traditional power source. In such a case, the determination engine 102 may determine that at least some of the traditional power can be saved, and thus the determination engine 102 may output a determined combination SEUL and TPSL 110 to be employed by or implemented at the RSU. The combination may allow the RSU to achieve a target SEUL through the use of green energy while also employing power saving capabilities. For example, sensing operations on the RSU may be increased when a green energy source is available for use (e.g., during daylight hours) and minimized or disabled when a green energy source is not available or when the RSU is using energy from a traditional energy source.

In another example, when another RSU in proximity to the RSU has a green energy source available and has similar/compatible sensing or compute capabilities as the RSU, at least a portion of the sensing or compute operations may be transferred, switched, offloaded, etc., to the other RSU, and disabled on the RSU itself. Further, some compute operations of the RSU may be delayed until power from a green energy source is available to the RSU. In such an example where sensing or compute operations are delayed, the determination engine 102 may determine a time period for the delay so that the RSU may still meet the requirements of an SLA/QoS of an application running or operating on the RSU.

The RSU may be connected to a network, such as an edge network, and the determination engine 102 may continuously assess current or future green energy availability in the network and adopt a layered offering of edge network services based on sustainable energy status. For example, more/additional functionality/operations/services available at the RSU may be run, implemented, utilized, etc., when a green energy source is available, while functionality/service is reduced (e.g., only displaying speed limits, or road signs on the RSU) when green energy is limited or unavailable.

Figure 2A:
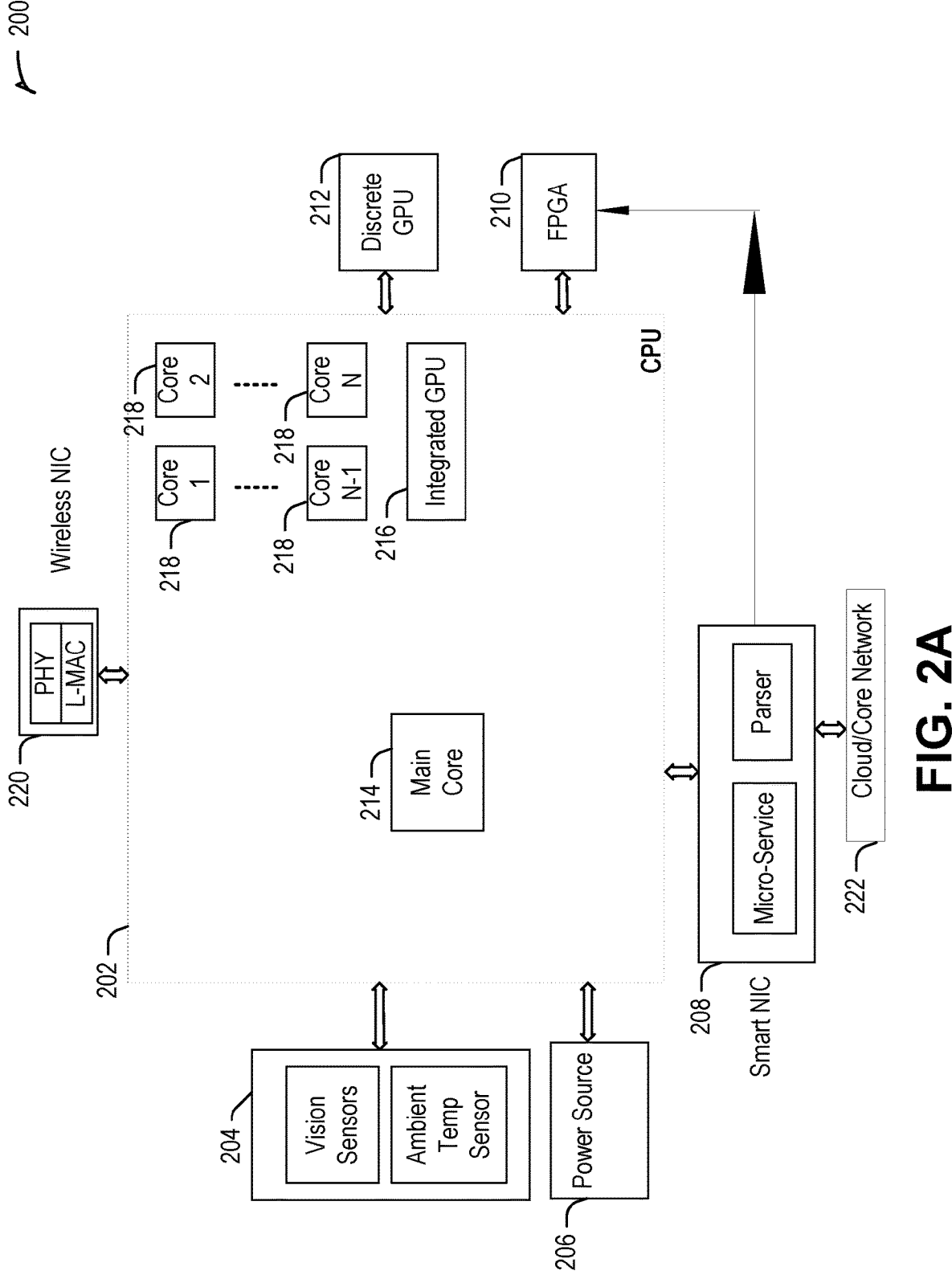
FIG. 2A illustrates an example architecture for a system for a sustainable energy usage and traditional power saving engine.

FIG. 2A illustrates an example architecture 200 for a system for a sustainable energy usage and traditional power saving engine. The architecture 200 illustrated in FIG. 2A may be onboard an RSU unit or on a machine/computer (e.g., a server) connected/coupled to the RSU. The architecture 200 may include a Central Processing Unit (CPU) 202 and may also include components connected to the CPU 202, including one or more sensors 204 (e.g., a camera or other vision sensor, a temperature sensor, etc.), one or more power sources 206, which may be a green power source (e.g., a wind or solar power source) or a traditional power source (e.g., mains power provided by an energy supplier over a power grid), or a combination thereof. The architecture may further include a smart Network Interface Controller (Smart-NIC) 208, which can, in turn, be coupled to a network server such as a cloud/core network 222. The Smart-NIC 208 may additionally be coupled to a Field Programmable Array (FPGA) 210 coupled to the CPU 202. The architecture 200 may also include a Wireless Network Interface Controller 220 and a discrete Graphics Processing Unit 212 connected to the CPU 202.

In an example, the CPU 202 may include several integrated components, including an integrated Graphics Processing Unit 216, and one or more cores 218. The CPU 202 may also include an integrated main core 214.

Figure 2B:
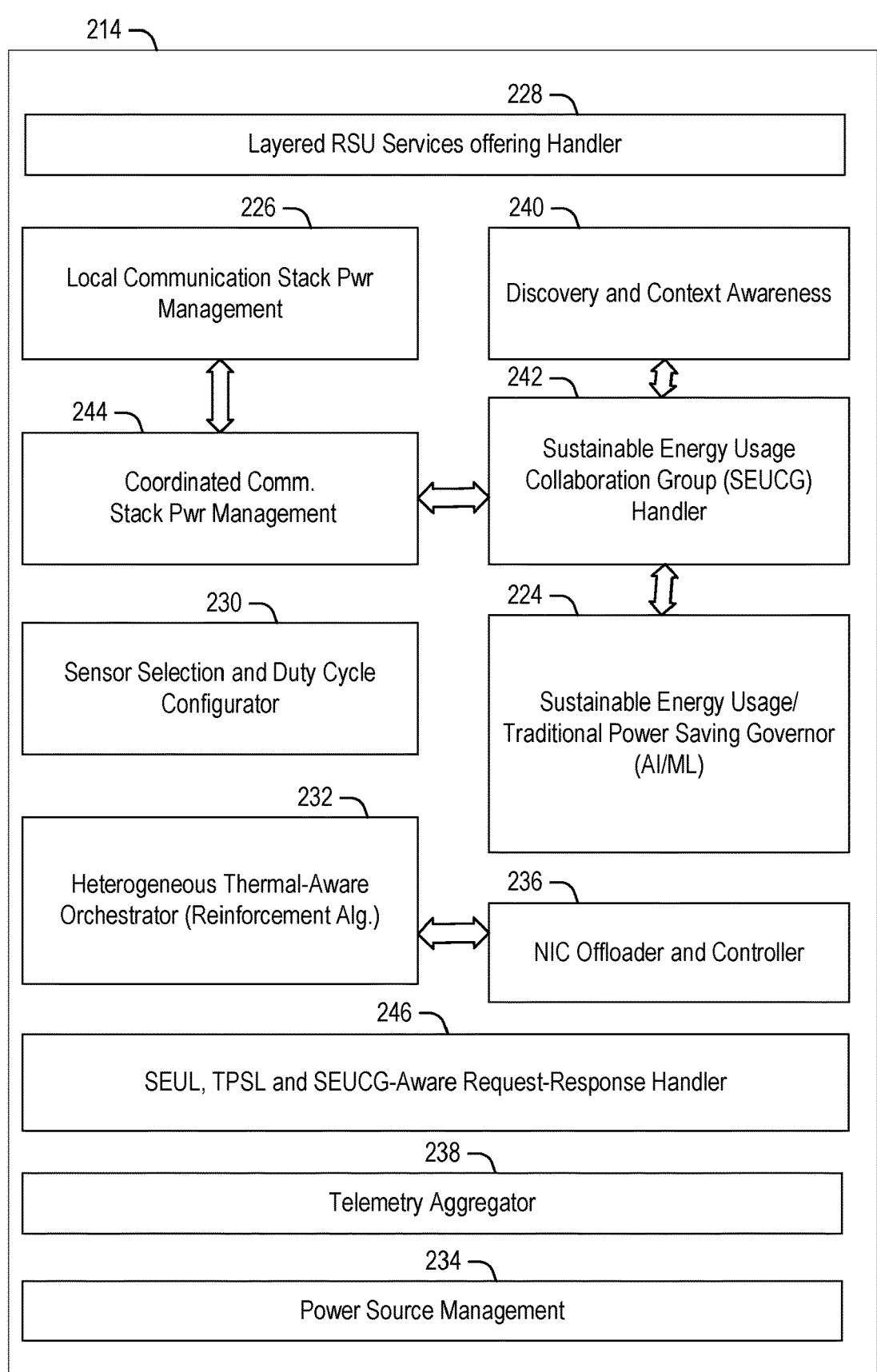
FIG. 2B illustrates an example of components of a main core included in the architecture of FIG. 2A.

FIG. 2B illustrates an example of components of a main/primary core 214 included in the architecture of FIG. 2A. In an example, the main core 214 can include a number of components, the components including a Sustainable Energy Usage (SEU)/Traditional Power Saving (TPS) Governor 224, a local communication stack power management component 226, a layered RSU services offering handler 228, a sensor selection duty cycle configurator 230, a heterogenous thermal-aware orchestrator 232, a power source management component 234, a NIC offloader/controller 236, and a telemetry aggregator 238.

The SEU/TPS Governor 224 may consider various input factors, such as the one or more input factors 104 discussed in reference to FIG. 1, to determine the SEULs and/or the TPSLs to be implemented by the RSU to achieve recommended SEUL and TPSL targets.

The local communication stack power management component 226 may predict demand for communication with various QoS requirements (e.g., real-time, delay-tolerant, traffic pattern (e.g., periodic, sparse)) which may be used to dynamically or semi-statically select an optimal period of sleep cycles for the wireless network interface controller 220.

The layered services offering handler 228 may assess (e.g., continuously, or periodically) current or determine future sustainable energy availability and/or usage at the RSU (or in the edge network) and adopt layered offering of edge network services based on sustainable energy status. For example, more functionalities/services may be offered or available to the RSU when a sustainable energy source is available, and while reducing functionalities or services (e.g., only display speed limit, road signs, etc.) when sustainable energy is limited or unavailable.

The sensor selection duty cycle configurator 230 may determine which set of sensors, such as the one or more sensors 204 (out of several sensors) should be selected for use by the RSU and what their duty cycle should be for the given context (e.g., information about current and future sustainable/green energy availability at sensors and sensor data-processing compute resources required or sensing demand).

The heterogenous thermal-aware orchestrator 232 may incorporate thermal awareness into a de facto computing orchestrator (e.g., Kubernetes®) using a reinforcement learning algorithm to learn what computation (kernel/layers) contributes to which level of thermal output and decides how to distribute the current workload across heterogenous computing resources given the ambient temperature. Thermal awareness may be used along with information about current and future green energy availability at the RSU to distribute current load across the heterogenous computing resources of the RSU.

The power source management component 234 may prioritize use of green power/energy whenever a green energy source is available. For example, when an RSU has a green power source available (and optionally, traditional/ grid power as backup), the power source management component 234 may periodically inform the SEU/TPS Governor 224 so that an RSU that is a part of a collaborative group (discussed below) with an available green energy source may have priority to remain active within the group while an RSU in the group without a green energy source available may be deactivated.

The NIC offloader/controller 236 may check the resource and performance requirements of microservices and dynamically determine their place of execution (e.g., the CPU 202, one of the cores 218, or the Smart-NIC 208). Based on this determination, The NIC offloader/controller 236 may install packet parsing rules into on-NIC storage so that incoming packets are routed to locally executed microservices instead of being passed to the one or more cores 218 of the CPU 202.

The telemetry aggregator may collect telemetry and meta-information from various components (e.g., current mix of workload, information about green energy availability at the RSU, compute-resources, available and/or number of active sensors, thermal information, power consumption from heterogenous compute resources, power usage by the active sensors, etc.). The collected information may be shared with the edge server to train an AI/ML model used to determine the SEUL, TPSL, or appropriate combination of green energy usage and traditional power saving schemes for the given workload.

Collaborative Grouping of Multiple RSUs

In locations where there are a dense deployment of RSUs (e.g., in city/urban roads or busy highways) it may be advantageous for the RSUs to communicate with each other. Communication among RSUs may be performed through a backhaul (wireless or wired) or through peer-to-peer wireless communication including multi-hop communication via road users (e.g., vehicles.) During peak/busy hours (e.g., during rush-hour commutes), all of the RSUs in an area may need to be active to fulfil communication, compute, or sensing requirements/needs of a smart transportation system. Conversely, during non-busy hours/days, there may be limited traffic with reduced or even heavily reduced demands for communication, compute, or sensing. In case of demand, selected RSUs may operate in low power consumption states to maintain reasonable QoE for smart transportation services.

RSUs located in proximity to each other (e.g., within a certain distance of each other; hereinafter "proximity RSUs") may have heterogeneous energy source types. For example, some RSUs may operate using a green energy source, some may operate using a traditional/non-green energy source, and some may operate using both energy source types. In such scenario, sustainable energy usage may be maximized if RSUs powered by a traditional energy source can offload compute operations to RSUs powered by a green energy source. Individual RSUs may determine green energy usage and traditional power saving schemes to achieve reduced traditional power consumption. However, coordination among proximity RSUs may optimize overall green energy usage and/or traditional power saving of a group of RSUs in a more effective way. Thus, proximity RSUs may form (or be combined into) a group that allows for collaboration among the RSUs to further enhance overall green energy usage or traditional power consumption levels of the group of RSUs.

Proximity RSUs may be defined not only by their distance from each other (e.g., RSUs within a certain amount of miles, meters, kilometers, etc., from each other), but their ability to communicate with one another, and/or based on the operations they are capable of performing. For example, RSUs within a certain distance from each other (e.g., within a mile of each other), with the ability to transmit communications between each other, and have the ability to perform similar operations, may be considered to be proximity RSUs. On the other hand, RSUs within a mile of each other that perform different operations, and/or cannot communicate with each other may not be considered proximity RSUs.

The collaborative group of RSUs may (i) switch sensing or compute operations to RSUs with currently available green energy sources, (ii) delay compute operations at certain RSUs in the group until green energy sources are available at a proximity RSU while meeting an application's QoS/SLA requirements, or (iii) turn off/deactivate any redundant resources (such as sensing or compute resources) at RSUs with no or limited green energy sources available so that only RSUs with available green energy sources within the group performs those operations or use those resources.

The collaborative group may utilize a Discovery and Context Awareness Protocol (DCAP) to periodically share a Discovery and Context Awareness Message (DCAM) (as discussed with respect to FIG. 3, below) to neighboring RSUs in the proximity of the RSU. The DCAP may enable the RSU to be aware of: a proximity communication topology among RSUs, sensing/compute/communication resources/capabilities at proximity RSUs, green energy availability at the proximity RSUs, or the like. Thus, a Sustainable Energy Usage Collaboration Group (SEUCG) may be formed at a Facility layer/Middleware among proximity RSUs (e.g., the case of dense RSU deployment) whereby RSUs in the SEUCG may share resource and demand information (such as CPU, accelerators, Smart-NICS, storage, communication/compute demands) as well as green energy availability to jointly optimize sensing, compute/processing, and communication operations to achieve maximum group green energy usage and traditional power saving. In an example, a certain RSU in the SEUCG may be designated a leader of the SEUCG to determine, select, and coordinate optimal group green energy usage and traditional power saving schemes.

An SEUCG may be formed in either an ad-hoc manner or through a centralized controller. In the case of ad-hoc formation, any RSU may initiate SEUCG formation based on factors such as sensing, compute, or communication demands, environmental conditions (or a change in any of those), or an intention or need to change a current SEUL or TSPL. In an example, an algorithm to form the SEUCG may be implemented at a facility layer or middleware (between an application and transport/network layers) in the RSU. Each RSU in the SEUCG may share information such as energy types available to the RSU, green energy availability at the RSU (e.g., amount, expected time of availability, availability of green energy storage, or the like), environment perception at the RSU, nodal status or information (e.g., device type for the RSU, where the RSU is located, device orientation, sensing capability, etc.), compute capability or resources (e.g., CPU types, availability of accelerators, available Smart-NICs, available storage, or the like), perceived communication/compute demands at the RSU, or a current load on resources at the RSU. An algorithm may be used whereby one of the RSUs in the group may be selected as a leader (e.g., with functionality similar to a centralized controller) with the ability to coordinate resource management, green energy usage, and traditional power saving among the members of the SEUCG.

Returning to FIG. 2B, some of the components of the main core 214 may be configured to specifically perform operations for or within the SEUCG. These components may include:

A Discovery and Context Awareness (DCA) component 240. The DCA component 240 may handle the DCAP which may continuously run at the Facility layer/Middleware on the RSUs in the SEUCG. Each RSU may periodically share a DCAM with neighboring RSUs in the proximity. The DCAM may contain information about green energy availability or compute-resources/sensors for a particular RSU in the SEUCG.

A SEUCG Handler 242. The SEUCG Handler 242 may analyze need for SEUCG formation and initiate formation of a SEUCG whenever coordination among RSUs is needed for optimal green energy usage and traditional power saving. This analysis may be performed continuously or periodically, as necessary, or desired. Once the SEUCG group is formed, the SEUCG Handler 242 may coordinate each particular RSU's role as either a member or the leader as described below.

A coordinated communication stack power management component 244. The coordinated communication stack power management component 244 may configure a communication component of the RSUs (e.g., a radio, a transmitter, etc.) sleep periodicity and duration based on a determination from the SEU/TPS Governor 224 and DCA component 240. The coordinated communication stack power management component 244 may coordinate sleep/awake start time for the RSUs in the SEUCG to maximize group radio awake duration for the SEUCG (e.g., a time, period of time, or duration when at least one RSU in the SEUCG is awake). The coordinated communication stack power management component 244 may also prioritize RSUs with green energy to remain awake for a longer duration/period of time to maximize green energy usage and reduce traditional energy consumption. The coordinated communication stack power management component 244 may obtain sleep information about the RSUs in the SEUCG through the DCAP. The coordinated communication stack power management component 244 may also align radio sleep duration with a sleep schedule of other resources (such as CPU, Sensor duty cycle or operating system duty cycle).

A SEUL, TPSL and SEUCG-Aware response handler 246. The SEUL, TPSL and SEUCG-Aware response handler 246 may coordinate compute or communication requests or responses when an RSU has active green energy usage and traditional power saving schemes running at it and/or when the RSU is a member of an SEUCG. For example, the SEUL, TPSL and SEUCG-Aware response handler 246 may identify a compute service request to be compute intensive (e.g., require a great amount of computing power or resources) and select the CPU on one or more of the RSUs in the SEUCG to wake in order to provide the required compute resources. In another example, the SEUL, TPSL and SEUCG-Aware response handler 246 may analyze an application's request or service packets to determine its QoS and compute requirements and then select one of the awake RSUs to handle the request from the application.

When a SEUCG is formed, the SEU/TPS Governor 224 may also contain a SEUCG leader role component to decide group strategy for green energy usage and traditional power saving optimization for the SEUCG when the RSU is acting as a leader of the SEUCG. The SEU/TPS Governor 224 may use an algorithm (e.g., an AI or ML algorithm) to determine or implement a group strategy for green energy usage and traditional power saving optimization among the SEUCG members based on information available about the group members at the leader RSU via the DCAP (e.g., compute/communication/sensing resources at RSUs/SEUCG-members, green energy available at group members, SEUL/TPSL selected by group members, compute/communication/sensing load predicted at members).

Figure 3:
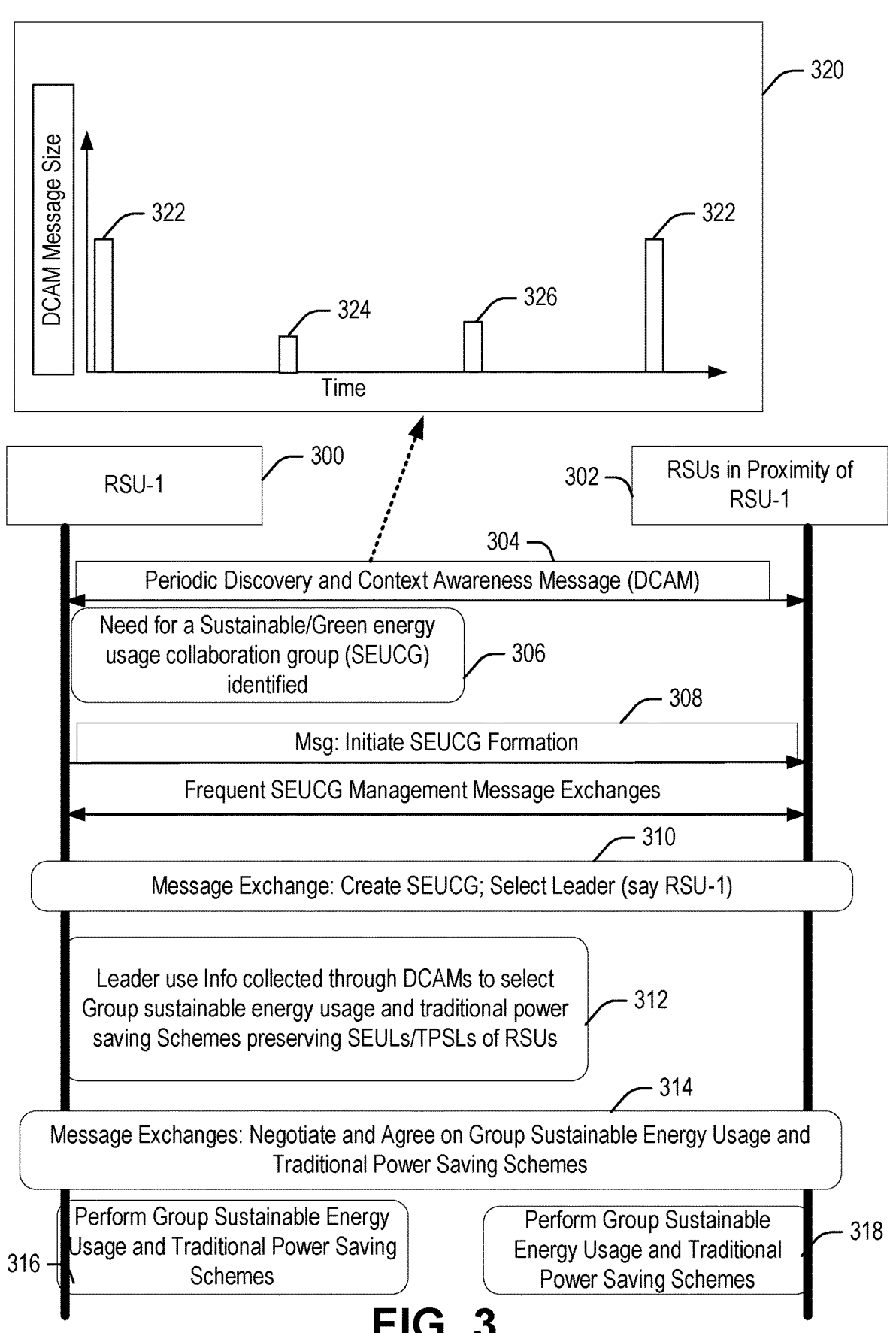
FIG. 3 illustrates an example of a flow diagram for the formation of a Sustainable Energy Usage Collaborative Group (SEUCG) among a group of RSUs.

FIG. 3 illustrates an example of a flow diagram for the formation of a Sustainable Energy Usage Collaborative Group (SEUCG) among a group of RSUs. In the example illustrated in FIG. 3, a Discovery Context Awareness Message (DCAM) 304 may be sent between a first RSU 300 and one or more proximate RSUs 302. The DCAM 304 may be transmitted on a DCAM schedule 320. In an example, some of the content in the DCAM 304 will not change on a frequent basis. As such, a full DCAM message 322 may be exchanged between the first RSU 300 and the one or more proximate RSUs 302 with a longer periodicity (e.g., a longer amount of time between transmissions of the full DCAM message 322). As information at the first RSU 300 or the one or more proximate RSUs 302 is updated, incremental DCAM messages such as first incremental DCAM message 324 and second incremental DCAM message 326 may be sent/transmitted between the first RSU 300 and the one or more proximate RSUs 302 in between transmissions of the full DCAM message 322. As indicated in the DCAM schedule 320, the incremental messages 324, 326 may contain a different amount of information, based on how a condition of the first RSU 300 or the one or more proximate RSUs 302 change. For example, the second incremental DCAM message 326 may contain more information than the first incremental DCAM message 324 (as indicated by the fact that the bar corresponding to the second incremental DCAM message 326 is longer than the bar corresponding to the first incremental DCAM message 324). Examples of the content that may be included in any of the full DCAM message 322, the first incremental DCAM message 324, or the second incremental DCAM message 326 include:

a. RSU information for each RSU, which may include an RSU/node identification, and location information.

b. Sensing capability and resource information for each RSU, which may include information about sensors coupled, connected, or attached to the RSU (e.g., LIDAR, RADAR, or cameras), sensor configuration, or energy source type associated with the sensors.

c. Cache/storage information for each RSU, which may include total cache memory/storage capacity or currently available cache memory/storage capacity.

d. Compute resources for each RSU, which may include processor types, available accelerators, available Smart-NICs, or the like.

e. Current load on resources for each RSU, which may include current (e.g., real-time or near real-time) load/occupancy information for compute and storage resources.

f. Communication capability for each RSU, which may include supported Radio Access Technology (RATs) or types of communication components on the RSU.

g. Perceived/predicted communication/compute/sensing demands of each RSU, which may include an amount of communication or compute demand each RSU is predicted to need or require over a period of time, or within an amount of time (e.g., over the next hour, within the next 15 minutes, or any applicable period of time). This may also include a predicted sensing load on one or more of the sensors coupled to each RSU over a period of time or within an amount of time.

h. Wake up sensor ability of the sensors coupled to each RSU, which may include information about the ability of the sensors of the RSUs to transition to and from a low-power/sleep/idle state, and/or radio/modem/transmitter wake-up capability.

i. Current SEULs and TPSLs for each RSU, which may include current SEU and TPS schemes in operation to meet/achieve SEULs and/or TPSLs for each of the RSUs.

j. SEUCG Information, which, when an RSU is an active member of a SEUCG, information about the SEUCG (described below) may be transmitted as a part of the DCAM messages.

In an example, the system may continuously monitor the first RSU 300 and the one or more proximate RSUs 302 to determine a need for SEUCG formation. It is understood that the system (e.g., the system architecture) may exist outside of the RSUs, such as on a cloud-based server, or any similar server or controller in communication with the RSUs (e.g., over a network). Additionally, or alternatively, the system or system architecture may be placed in an RSU such as the first RSU 300 or any of the one or more proximate RSUs 302. Additionally, or alternatively, the system or system architecture may be on a module or component that may be connected to the RSU (e.g., plugged into the RSU via a pin connector, a Universal Serial Bus (USB) connection, etc.). Further, the system or system architecture may be placed on a host RSU with the ability to monitor itself and proximate RSUs. The need for SEUCG formation may be determined by one or more factors, including a change in availability of green energy at one or more of the RSUs, a change in predicted/perceived communication, compute, or sensing demands at one or more of the RSUs, a change in environmental or traffic conditions (e.g., the sun going down, low traffic due to time of day, weekend day vs weekday, or a holiday, road construction or road closures, or the like), or a change (or intention to change) in an SEUL or a TPSL at one or more RSUs.

Once the system (or an RSU such as first RSU 300) determines a need to form a SEUCG (e.g., based on one or more reasons as detailed below) at Operation 306, a message to initiate SEUCG formation, formation message 308 may be sent. When the first RSU 300 initiates the formation of the SEUCG, the formation message 308 may be sent from the first RSU 300 to the one or more proximate RSUs 302. When a controller/handler/server or the like controlling the first RSU 300 and the one or more proximity RSUs 302 determines the need for SEUCG formation, the formation message 308 may be sent/transmitted to all of the RSUs by the controller. To determine the need for RSU formation, the system may continuously monitor the first RSU 300 and the one or more proximate RSUs 302 to determine, for example, a change in availability of green energy at one or more of the RSUs, a change in compute demands, or the like, as discussed below. Then, based on any such changes, the system may determine if any proximate RSU is available and/or capable to take on some operations or functionality from the RSU experiencing the changed demands/circumstances and form an SEUCG based on those determinations.

In an example, an identifier (SEUCG-Id) may be generated for or assigned to each of the RSUs to be added to the SEUCG. The SEUCG-Id may be derived from an RSU-Node identifier, RSU location, time, or a combination thereof, and sent in the formation message 308. The contents of the formation message 308 may further include one or more of:

a. Reasons for SEUCG Formation, which may indicate a change in availability of green energy, a change in predicted or perceived communication, compute, or sensor demand, a change in environmental context, prediction of change in current SEULs or TPSLs.

b. Intention-to-Serve-as-SEUCG-Leader, which, when an RSU initiates formation of the SEUCG, the initiating RSU may designate itself as the leader of the SEUCG. When a controller forms the SEUCG, the controller may designate an RSU to be the leader of the group or, alternatively, may assign no leader and the controller may designate/control all of the operations of the RSUs of the SEUCG.

c. SEUCG-Formation-Initiation-Time, which may be a timestamp or another similar indication of the time of the formation request such that when multiple formation initiations from multiple RSUs occur within a short period of time (e.g., within seconds or minutes of each other), the earliest formation initiation request/message/intention may get the highest priority.

In an example, one or more messages such as message exchange 310 and message exchange 314 may be sent to the members of the SEUCG. The message exchanges may include some content as described above for the formation message 308 or may include other content such as commands to the members of the SEUCG. For example, message exchange 310 may include a command to create/form the group, and a command to select a leader of the group (e.g., first RSU 300). In response to messages exchange 310, the RSU designated the leader, such as first RSU 300 may, at Operation 312, may use information collected through the DCAM 304 to select group sustainable energy usage and traditional power save schemes to implement the SEULs and/or TPSLs of the RSUs in the SEUCG. Message exchange 314 may include messages to negotiate and determine a group sustainable energy usage scheme and/or a group power saving scheme, which may also include commands for particular RSUs in the group to use available green energy and for other particular RSUs in the group to implement one or more of the power saving schemes discussed above.

In response to the message exchanges, at Operation 316, the first RSU 300 may perform or initiate the commands or steps to implement the group sustainable energy usage scheme, or the group traditional power saving scheme negotiated in message exchange 314. Similarly, at Operation 318, the one or more proximate RSUs 302 may perform or initiate the commands or steps to implement the group sustainable energy usage scheme, or the group traditional power saving scheme set forth in message exchange 314.

As discussed above, once a SEUCG is formed, one of the RSUs may be designated as a leader. For example, initially, the first RSU 300 may be designated the leader of the group. Once the SEUCG is formed however, a different RSU, for example one of the one or more proximate RSUs 302 may be made/promoted to leader based on criteria such as one or more of:

a. The RSU that has the highest green energy availability (e.g., as measured by a current/real-time/near real-time) level or amount of green energy available.

b. The RSU that has the highest amount of compute capability.

c. The RSU that is active (e.g., the RSU's transmitter is not inactive and/or its processors or other compute resources are not in sleep/idle states (or not about to be put into an inactive/idle state)).

d. The RSU that has the best communication capability (e.g., links) with the most members of the group.

In an example, the system (or the RSU designated the leader of the group) may use one or more intelligent (e.g., AI or ML) algorithms to determine a group sustainable energy usage strategy and/or a traditional power saving strategy to meet a group SEUL or a group TPSL. The strategies may be based on information available about the RSUs forming the group and the system (or the RSU designated the leader of the group) may cause the members of the group to implement the schemes. The strategies may be changed or adjusted based on changes in conditions in the RSUs forming the SEUCG. The adjustments may be negotiated by the members of the SEUCG, determined/made by the RSU designated the leader of the SEUCG, or determined/made by a controller or server controlling each member of the SEUCG.

In an example, the group SEUL and/or the group TPSL may cause a new SEUL or TPSL for each respective member of the SEUCG to be determined. In such an example, the new SEUL or TPSL for the respective member may be greater than or equal to what the SEUL or TPSL was for the respective member before formation of the group. Meaning, that formation of a SEUCG should cause the SEUL or TPSL for the members of the group to increase by virtue of the members of the group working collectively. For each member of the group, the system may specify a mix of green energy usage and traditional power saving schemes to achieve the new SEUL or TPSL. The schemes may include one or more methods of sensing power optimization, compute/processing power optimization, communication/protocol stack optimization, or layering functionalities of the RSU or layered offering of the RSU/Edge services, similar to the schemes discussed above.

The RSUs forming the SEUCG may continue to periodically share DCAM messages and each RSU may adjust the period of its own message transmission, either the full DCAM message 322, the first incremental DCAM message 324, or the second incremental DCAM message 326 to align with its transmitter sleep-wake periodicity. In another example, the system or the RSU designated the leader of the SEUCG may periodically send aggregated DCAM messages ensuring that most members in the SEUCG receive information about the other RSUs in the group. In such an example when the leader is sending the aggregated DCAM messages, the leader's transmitter awake periodicity may be adjusted (e.g., shortened) so that the leader can repeat the aggregated DCAM message frequently so that at least one copy of the aggregated DCAM message is received by each member of the SEUCG within a reasonable time. Meaning the leader will send the aggregated DCAM message at least once when an individual member of the SEUCG has its transmitter active/awake regardless of whether the transmitters of the other RSUs in the group are idle/asleep at the same time.

In an example, the system may configure the communication transmitters of selected RSUs in the SEUCG to sleep periodically in a coordinated way (e.g., a mechanism similar to 3GPP LTE/NR DRX). For example, sleep periods for the RSUs of the group may be selected or implemented in such a way that vehicles or potential vehicles in the area covered/monitored by the SEUCG may communicate with at least one RSU at any time (or within a given latency bound). For example, using a one or two-hop peer-to-peer communication for compute or other request. Thus, the system may select one or more RSUs in the SEUCG to idle or sleep for different durations such that at least one RSU in the group may communicate with a vehicle at a given time. Further, the system may continuously discover/determine and update a SEUCG topology and demand map. The SEUCG topology and demand map may be used to select which RSUs in the SEUCG to put in an idle state and determine sleep periods and sleep-start-cycles for these selected RSUs.

Similarly, the system may coordinate sleep/wake-up start time between the RSUs in the SEUCG to maximize group transmitter wake up duration for the SEUCG (e.g., time when at least one RSU in the SEUCG is awake). The system may obtain transmitter sleep information about the RSUs in the SEUCG through the various message exchanges. The system may also select the periodicity of a wake up cycle and a wake up duration for transmitters at various RSUs differently so that wake up duration of transmitters of the RSUs using green energy is maximized while the transmitter of the RSUs with traditional energy is minimized.

In an example, compute operations at one or more RSUs with only a traditional energy source currently active may be turned off while keeping its transmitter turned on as a group SEU or TPS optimization strategy. Any compute requirements/request at these inactive RSUs can then be forwarded to the RSUs with compute operations turned on (preferably RSU with green energy sources available). The system may analyze application request/service packets, determine its QoS and compute requirements, and then select one of the active RSUs handle the request. RSU selection may depend on one or more of sustainable energy availability at the active RSUs, load balancing among RSUs, resource availability at active RSUs, or an amount of data to be transferred for required compute operation. In an example, a heavy data transfer to another RSU for compute offload may activate the compute resource at the current RSU so that it can handle the compute operation (e.g., the compute operation will not be offloaded) to save communication overhead.

On the other hand, operations/services requiring less compute or processing resources may be offloaded to RSUs with accelerators or that have Smart-NICs with one or more wimpy cores in the SEUCG, and load balancing may be considered while offloading such micro-services. This may allow RSUs with CPUs operating on/powered by non-green energy sources to remain in a sleep state to save power.

AI/ML Based Selection of SEULs and TPSLs

An RL-based framework with a Deep Neural Network (DNN) based classification algorithm may be used to predict SEULs and TPSLs. Given an environment state, the green energy usage and traditional power saving QoS targets serve as cost imposing constraints that are jointly fed into an RL-based classifier using a DNN trained for classification. Additionally, historical SEUL and TPSL target logs obtained from observed past operational states are also utilized to train the RL classifier. The RL-classifier may generate predicted or estimated SEULs and/or TPSLs, which can be a weighted combination of several SEUL and/or TPSL levels from $\{0, \ldots, n\}$.

Figure 4:
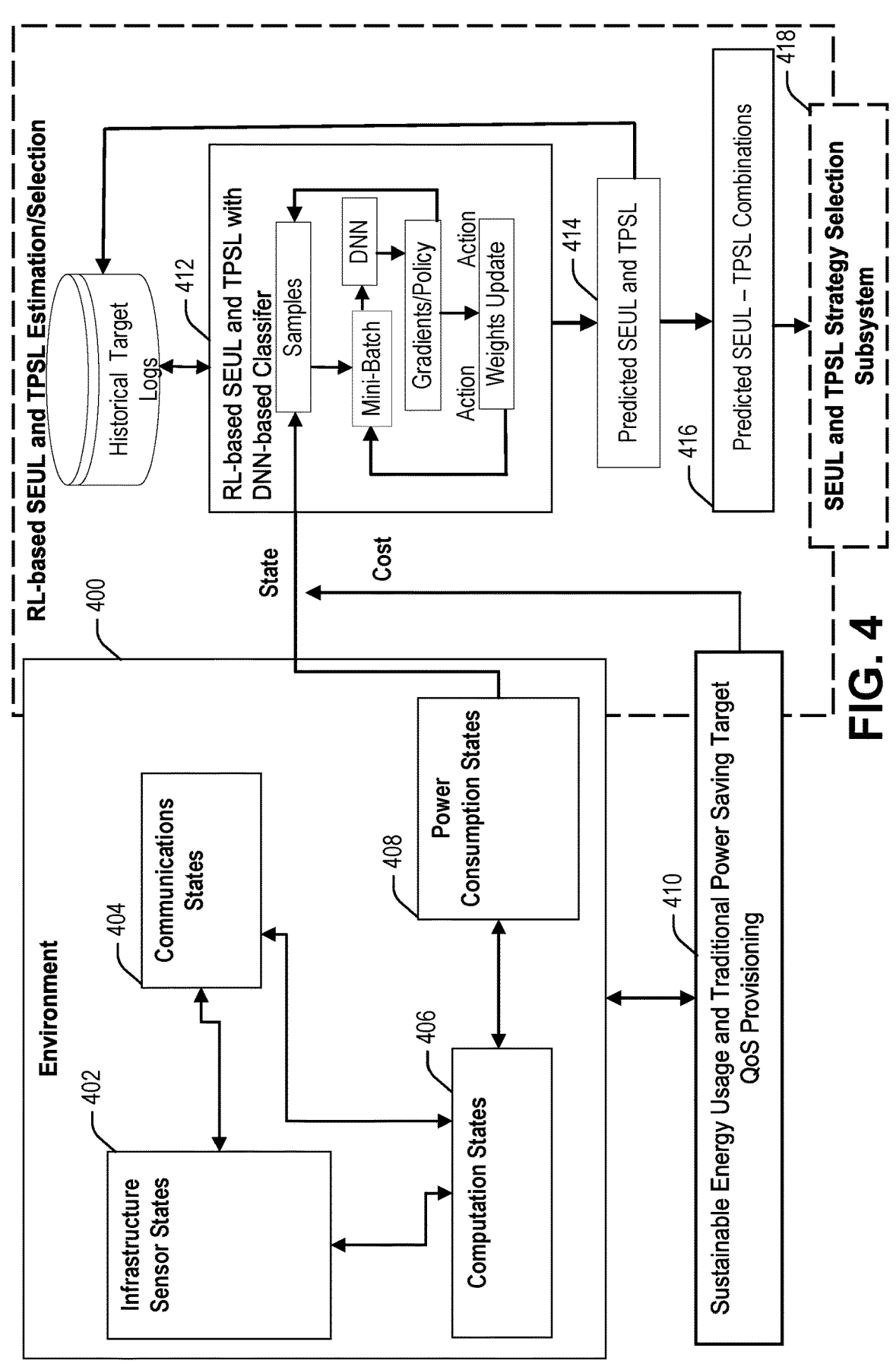
FIG. 4 illustrates an example of a Reinforced Learning (RL) based sustainable energy usage and traditional power saving selection scheme.

FIG. 4 illustrates an example of a Reinforced Learning (RL) based sustainable energy usage and traditional power saving selection scheme. In the example illustrated in FIG. 4, information about one or more states of the environment 400 in which an RSU is located may be entered into an RL-based classifier 412. The states may include:

One or more infrastructure sensor states 402. The one or more infrastructure sensor states 402 may include at least one of: road environment semantics, states of sensors (e.g., a camera, LIDAR, or RADAR), position of the RSU, road traffic awareness, weather conditions at the RSU, temperature at the RSU's location, or any similar state conditions.

One or more computation states 406. The one or more computation states 406 including one or more of: a number of free cores of the RSU, processing latency, cycle frequency, buffer size, or the like.

One or more communication states 404. The one or more communication states may include at least one of: physical layer transmit mode/numerology/PER, medium access control (MAC), available PHY resources, network topology or activity, load/congestion/traffic, communication applications/services, or the like.

One or more power consumption states 408, including one or more of: energy allocation per task, task requests/pipelines, available SEULs and/or TPSLs, or the like.

In an example, SEUL and TPSL targets based on one or more QoS requirements may also be input into the RL-based classifier 412 from a SEUL-TPSL QoS Provisioning component 410. In an example, the various states from the environment 400 may be aggregated and input along with cost from the SEUL-TPSL QoS Provisioning component 410 into the RL-based classifier 412. The RL-based classifier 412 may output a predicted SEUL and TPSL 414, which may include one or more Predicted SEUL-TPSL Combinations 416. The one or more Predicted SEUL-TPSL Combinations 416 may include a single SEUL and a single TPSL in a pair (e.g., $W_1=(SEUL_1, TPSL_1)$, $W_2=(SEUL_2, TPSL_2) \ldots W_n=(SEUL_n, TPSL_n)$). In another example, the one or more Predicted SEUL-TPSL Combinations 416 may include a weighted combination of multiple SEUL-TPSL pairs (e.g., Weighted Combination of $(SEUL_1, TPSL_1)$, $(SEUL_2, TPSL_2) \ldots (SEUL_n, TPSL_n)$) for one or more service level or QoS requirements.

When a specific SEUL and/or TPSL is to be selected, the weights of the rest of the SEUL and/or TPSL levels may be zero, thus generating a single SEUL and/or TPSL recommendation per service and/or QoS provisioning. On the other hand, the outcome of the SEUL and/or TPSL can be input into a SEUL-TPSL Strategy Selection Subsystem 418 which may be based on a similar RL-framework to yield one or more of SEUL or TPSL and traditional power strategy selections to be implemented by an RSU or the members of the SEUCG.

Figure 5:
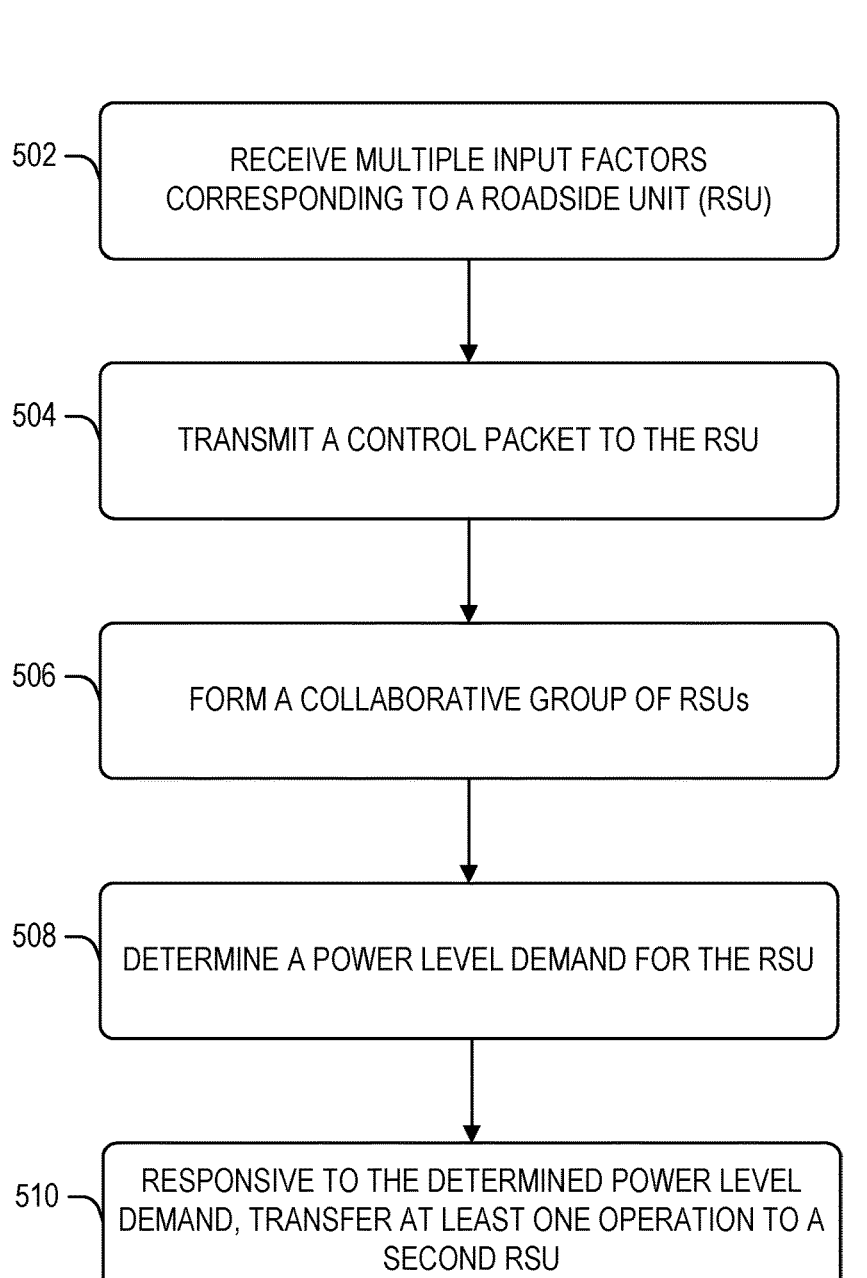
FIG. 5 illustrates a flowchart showing an example method for power management of an RSU.

FIG. 5 illustrates a flowchart showing an example method 500 for power management of an RSU. Step 502 may include receiving multiple input factors corresponding to an RSU. The input factors may correspond to at least one environmental condition at a location at which the RSU is located, a power saving preference for the RSU, a green energy usage preference for the RSU, a type of energy source connected to the RSU (e.g., a type or green energy source or a traditional power source), a QoS requirement, and a capability of the RSU. The capability of the RSU may include one or more operations capable of being/able to be performed by the RSU (e.g., a sensing operation, a communication operation, a compute operation, or any similar operation).

Operation 504 may include transmitting a control packet to the RSU. The control packet may include one or more parameters to control a mixture of green energy use by the RSU from a green energy power source (e.g., a solar energy generator or a wind energy generator) and traditional energy use or traditional energy reduction by the RSU from a traditional energy power source (e.g., mains power provided from an energy supplier over a power grid). When the traditional power source is the only active power source connected to the RSU, a particular parameter of the one or more parameters is a power consumption reduction target. The power consumption reduction target may be a percentage reduction (e.g., a twenty percent reduction) of an estimated maximum power consumption of the RSU (e.g., one hundred percent).

When both of the green energy power source and the traditional power source are active and connected to the RSU, the parameters may include the power consumption reduction target and a green energy usage target. The green energy usage target may be a percentage (e.g., twenty percent green energy use) of the estimated maximum power consumption of the RSU (e.g., one hundred percent).

Operation 506 may include forming a collaborative group of RSUs. In an example, the collaborative group may include the RSU and a second RSU communicatively coupled to the RSU. It is understood that there may be any number of RSUs making up the collaborative group, the number of which may be based on the amount of RSUs in proximity to each other, the ability of the RSUs in proximity to each other to communicate with each other, or any similar factor.

Operation 508 may include determining a power-level demand for the RSU. The power level demand may be an amount of power needed to perform an operation (e.g., a sensing operation, a compute/processing operation, or a communication operation) by the RSU. Operation 510 may include, based on the determined power-level demand, transferring the at least one operation to the second RSU. In an example, the second RSU may use a green energy source to meet the power demand required to perform the operation, whereas the RSU may not have enough green energy available to it to meet the power demand required to perform the operation.

Figure 6:
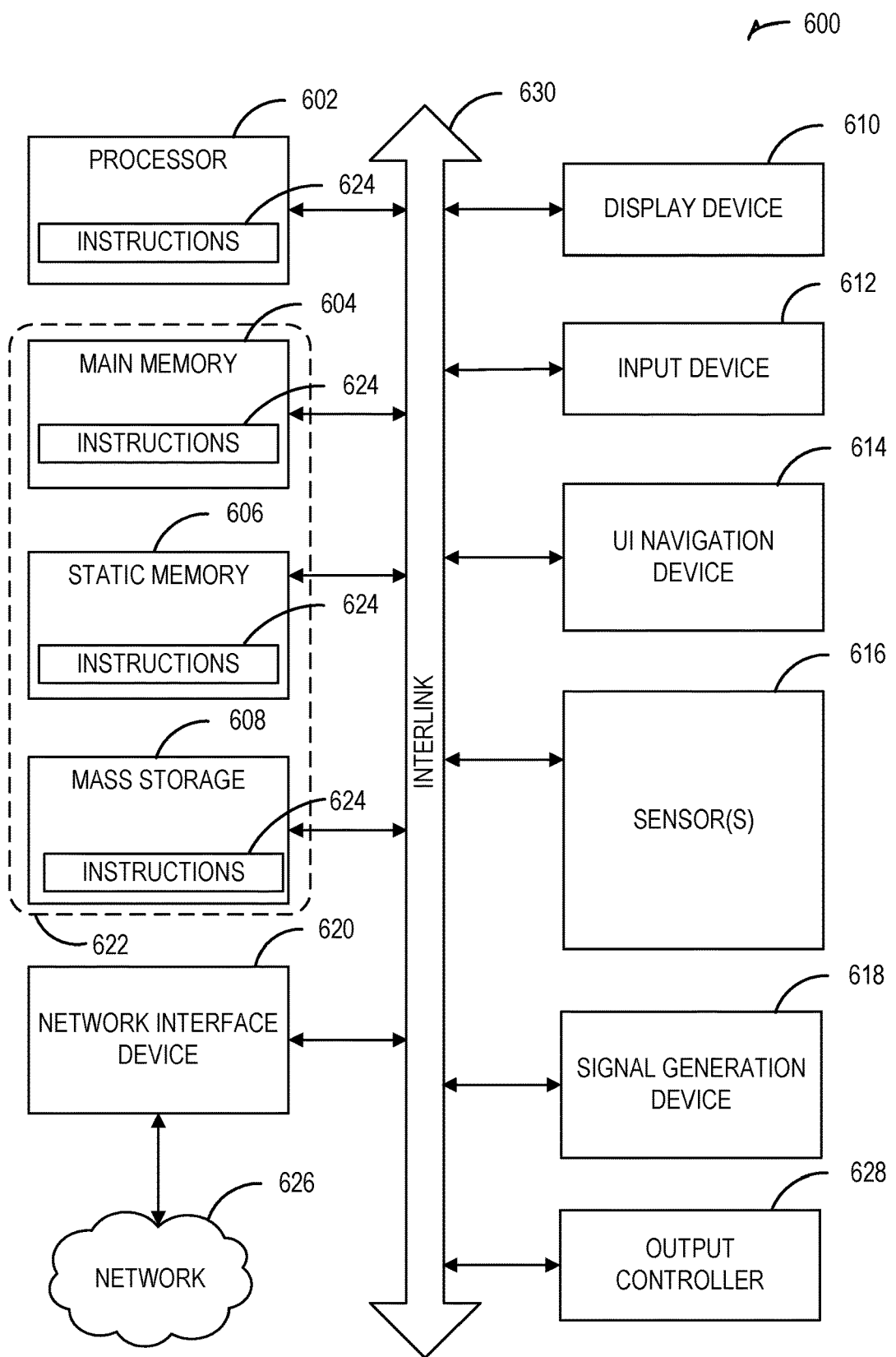
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, field programmable gate array (FPGA), or any combination thereof), a main memory 604 and a static memory 606, some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 608 may include a machine readable medium 622 (e.g., a non-transitory medium) on which is stored one or more sets of data structures or instructions 624 (e.g., software) embodying or used by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 608 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

ADDITIONAL NOTES & EXAMPLES

Example 1 is a system for power management for a roadside unit (RSU), the system comprising: a processor; and memory coupled to the processor, the memory configured to store instructions that, when executed by processor, cause the processor to execute operations, the operations comprising: receiving multiple input factors corresponding to an environmental condition at a location at which the RSU is located and at least one of a power saving preference for the RSU, a green-energy usage preference for the RSU, a type of energy source connected to the RSU, a quality of service (QoS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source.

In Example 2, the subject matter of Example 1 optionally includes wherein the green-energy power source includes at least one of a solar energy generator or a wind energy generator.

In Example 3, the subject matter of Example 2 optionally includes wherein the solar energy generator or the wind energy generator is connected to the RSU independently from a power grid.

In Example 4, the subject matter of any one or more of Examples 2-3 optionally include wherein the solar energy generator or the wind energy generator is directly connected to the RSU.

In Example 5, the subject matter of any one or more of Examples 1-4 optionally include wherein the traditional power source includes mains power provided from an energy supplier over a power grid.

In Example 6, the subject matter of any one or more of Examples 1-5 optionally include wherein the traditional power source is connected to the RSU via an indirect connection.

In Example 7, the subject matter of any one or more of Examples 1-6 optionally include wherein the traditional power source is the only active power source connected to the RSU, wherein a particular parameter of the parameters is a power consumption reduction target, and wherein the power consumption reduction target is a percentage reduction of an estimated maximum power consumption of the RSU.

In Example 8, the subject matter of Example 7 optionally includes wherein the memory includes instructions, that when executed by the processor, cause the processor to execute operations comprising: powering off a component of the RSU; placing an additional component of the RSU into a low-power state; and disabling a particular operation of the RSU to progress toward the power consumption reduction target.

In Example 9, the subject matter of Example 8 optionally includes wherein the component is a sensor coupled to the RSU.

In Example 10, the subject matter of Example 9 optionally includes wherein the sensor is a camera, a Light Detection and Ranging (LIDAR) device, or a Radio Detection and Ranging (RADAR) device.

In Example 11, the subject matter of any one or more of Examples 8-10 optionally include wherein powering off of the component of the RSU, the placing of the additional component of the RSU into a low-power state, and the disabling the particular operation is done for a period of time, and wherein the period of time determined by a machine-learning algorithm to progress toward the power consumption reduction target.

In Example 12, the subject matter of any one or more of Examples 1-11 optionally include wherein both of the green energy power source and the traditional power source are active and connected to the RSU, and wherein the parameters include: a green energy usage target, wherein the green energy usage target is a percentage of an estimated maximum power consumption of the RSU; and a power consumption reduction target, wherein the power consumption reduction target is a percentage reduction of the estimated maximum power consumption of the RSU.

In Example 13, the subject matter of Example 12 optionally includes wherein the memory includes instructions, that when executed by the processor, cause the processor to execute operations comprising: continuously monitoring an amount of green energy available from the green energy power source; and activating at least one previously inactive component of the RSU.

In Example 14, the subject matter of any one or more of Examples 1-13 optionally include wherein the memory includes instructions, that when executed by the processor, cause the processor to execute operations comprising: forming a collaborative group, the collaborative group including the RSU and a second RSU communicatively coupled to the RSU; determining a power-level demand for the RSU; and responsive to the power-level demand, transferring the at least one operation to the second RSU.

In Example 15, the subject matter of Example 14 optionally includes wherein the RSU and the second RSU are configurable to transmit respective status information, the respective status information including a current resource usage and at least one of: an available energy source type, a green-energy availability, an environment perception, a compute capability, a communication demand, or a compute demand.

In Example 16, the subject matter of Example 15 optionally includes wherein the respective status information is transmitted in a message exchanged between the RSU and the second RSU.

In Example 17, the subject matter of any one or more of Examples 15-16 optionally include wherein the current resource usage includes information regarding one or more sensors coupled to the RSU and one or more sensors coupled to the second RSU.

In Example 18, the subject matter of Example 17 optionally includes wherein the information regarding the one or more sensors coupled to the RSU includes information about an energy source type connected to the one or more sensors coupled to the RSU, and wherein the information about the one or more sensors coupled to the second RSU includes information about an energy source type connected to the one or more sensors coupled to the second RSU.

In Example 19, the subject matter of Example 18 optionally includes wherein the information regarding one or more sensors coupled to the RSU and the one or more sensors coupled to the second RSU further includes information about an availability of a low-power wake-up capability of the one or more sensors coupled to the RSU and the one or more sensors coupled to the second RSU.

Example 20 is a computer implemented method of power management for a roadside unit (RSU), the method comprising: receiving multiple input factors corresponding to an environmental condition at a location at which the RSU is located and at least one of a power saving preference for the RSU, a green-energy usage preference for the RSU, a type of energy source connected to the RSU, a quality of service (QoS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source.

In Example 21, the subject matter of Example 20 optionally includes wherein the green-energy power source includes at least one of a solar energy generator or a wind energy generator.

In Example 22, the subject matter of Example 21 optionally includes wherein the solar energy generator or the wind energy generator is connected to the RSU independently from a power grid.

In Example 23, the subject matter of any one or more of Examples 21-22 optionally include wherein the solar energy generator or the wind energy generator is directly connected to the RSU.

In Example 24, the subject matter of any one or more of Examples 20-23 optionally include wherein the traditional power source includes mains power provided from an energy supplier over a power grid.

In Example 25, the subject matter of any one or more of Examples 20-24 optionally include wherein the traditional power source is connected to the RSU via an indirect connection.

In Example 26, the subject matter of any one or more of Examples 20-25 optionally include wherein the traditional power source is the only active power source connected to the RSU, wherein a particular parameter of the parameters is a power consumption reduction target, and wherein the power consumption reduction target is a percentage reduction of an estimated maximum power consumption of the RSU.

In Example 27, the subject matter of Example 26 optionally includes powering off a component of the RSU; placing an additional component of the RSU into a low-power state; and disabling a particular operation of the RSU to progress toward the power consumption reduction target.

In Example 28, the subject matter of Example 27 optionally includes wherein the component is a sensor coupled to the RSU.

In Example 29, the subject matter of Example 28 optionally includes wherein the sensor is a camera, a Light Detection and Ranging (LIDAR) device, or a Radio Detection and Ranging (RADAR) device.

In Example 30, the subject matter of any one or more of Examples 27-29 optionally include wherein powering off of the component of the RSU, the placing of the additional component of the RSU into a low-power state, and the disabling the particular operation is done for a period of time, and wherein the period of time determined by a machine-learning algorithm to progress toward the power consumption reduction target.

In Example 31, the subject matter of any one or more of Examples 20-30 optionally include wherein both of the green energy power source and the traditional power source are active and connected to the RSU, and wherein the parameters include: a green energy usage target, wherein the green energy usage target is a percentage of an estimated maximum power consumption of the RSU; and a power consumption reduction target, wherein the power consumption reduction target is a percentage reduction of the estimated maximum power consumption of the RSU.

In Example 32, the subject matter of Example 31 optionally includes continuously monitoring an amount of green energy available from the green energy power source; and activating at least one previously inactive component of the RSU.

In Example 33, the subject matter of any one or more of Examples 20-32 optionally include forming a collaborative group, the collaborative group including the RSU and a second RSU communicatively coupled to the RSU; determining a power-level demand for the RSU; and responsive to the power-level demand, transferring the at least one operation to the second RSU.

In Example 34, the subject matter of Example 33 optionally includes wherein the RSU and the second RSU are configurable to transmit respective status information, the respective status information including a current resource usage and at least one of: an available energy source type, a green-energy availability, an environment perception, a compute capability, a communication demand, or a compute demand.

In Example 35, the subject matter of Example 34 optionally includes wherein the respective status information is transmitted in a message exchanged between the RSU and the second RSU.

In Example 36, the subject matter of any one or more of Examples 34-35 optionally include wherein the current resource usage includes information regarding one or more sensors coupled to the RSU and one or more sensors coupled to the second RSU.

In Example 37, the subject matter of Example 36 optionally includes wherein the information regarding the one or more sensors coupled to the RSU includes information about an energy source type connected to the one or more sensors coupled to the RSU, and wherein the information about the one or more sensors coupled to the second RSU includes information about an energy source type connected to the one or more sensors coupled to the second RSU.

In Example 38, the subject matter of Example 37 optionally includes wherein the information regarding one or more sensors coupled to the RSU and the one or more sensors coupled to the second RSU further includes information about an availability of a low-power wake-up capability of the one or more sensors coupled to the RSU and the one or more sensors coupled to the second RSU.

Example 39 is at least one non-transitory machine-readable medium including instructions that, when executed with a processor of a computing device, cause the computing device to perform electronic operations to: receive multiple input factors corresponding to an environmental condition at a location at which a roadside unit (RSU) is located and at least one of a power saving preference for the RSU, a green-energy usage preference for the RSU, a type of energy source connected to the RSU, a quality of service (QoS) requirement, or a capability of the RSU, wherein the capability of the RSU includes at least one operation capable of being performed by the RSU; and transmit a control packet to the RSU, the control packet including parameters to control a mixture of green energy use by the RSU from a green-energy power source and traditional energy use by the RSU from a traditional energy power source.

In Example 40, the subject matter of Example 39 optionally includes wherein the green-energy power source includes at least one of a solar energy generator or a wind energy generator.

In Example 41, the subject matter of Example 40 optionally includes wherein the solar energy generator or the wind energy generator is connected to the RSU independently from a power grid.

In Example 42, the subject matter of any one or more of Examples 40-41 optionally include wherein the solar energy generator or the wind energy generator is directly connected to the RSU.

In Example 43, the subject matter of any one or more of Examples 39-42 optionally include wherein the traditional power source includes mains power provided from an energy supplier over a power grid.

In Example 44, the subject matter of any one or more of Examples 39-43 optionally include wherein the traditional power source is connected to the RSU via an indirect connection.

In Example 45, the subject matter of any one or more of Examples 39-44 optionally include wherein the traditional power source is the only active power source connected to the RSU, wherein a particular parameter of the parameters is a power consumption reduction target, and wherein the power consumption reduction target is a percentage reduction of an estimated maximum power consumption of the RSU.

In Example 46, the subject matter of Example 45 optionally includes wherein the instructions further cause the processor to: power off a component of the RSU; place an additional component of the RSU into a low-power state; and disable a particular operation of the RSU to progress toward the power consumption reduction target.

In Example 47, the subject matter of Example 46 optionally includes wherein the component is a sensor coupled to the RSU.

In Example 48, the subject matter of Example 47 optionally includes wherein the sensor is a camera, a Light Detection and Ranging (LIDAR) device, or a Radio Detection and Ranging (RADAR) device.

In Example 49, the subject matter of any one or more of Examples 46-48 optionally include wherein powering off of the component of the RSU, the placing of the additional component of the RSU into a low-power state, and the disabling the particular operation is done for a period of time, and wherein the period of time determined by a machine-learning algorithm to progress toward the power consumption reduction target.

In Example 50, the subject matter of any one or more of Examples 39-49 optionally include wherein both of the green energy power source and the traditional power source are active and connected to the RSU, and wherein the parameters include: a green energy usage target, wherein the green energy usage target is a percentage of an estimated maximum power consumption of the RSU; and a power consumption reduction target, wherein the power consumption reduction target is a percentage reduction of the estimated maximum power consumption of the RSU.

In Example 51, the subject matter of Example 50 optionally includes wherein the instructions further cause the processor to: continuously monitoring an amount of green energy available from the green energy power source; and activating at least one previously inactive component of the RSU.

In Example 52, the subject matter of any one or more of Examples 39-51 optionally include wherein the instructions further cause the processor to: form a collaborative group, the collaborative group including the RSU and a second RSU communicatively coupled to the RSU; determine a power-level demand for the RSU; and responsive to the power-level demand, transfer the at least one operation to the second RSU.

In Example 53, the subject matter of Example 52 optionally includes wherein the RSU and the second RSU are configurable to transmit respective status information, the respective status information including a current resource usage and at least one of: an available energy source type, a green-energy availability, an environment perception, a compute capability, a communication demand, or a compute demand.

In Example 54, the subject matter of Example 53 optionally includes wherein the respective status information is transmitted in a message exchanged between the RSU and the second RSU.

In Example 55, the subject matter of any one or more of Examples 53-54 optionally include wherein the current resource usage includes information regarding one or more sensors coupled to the RSU and one or more sensors coupled to the second RSU.

In Example 56, the subject matter of Example 55 optionally includes wherein the information regarding the one or more sensors coupled to the RSU includes information about an energy source type connected to the one or more sensors coupled to the RSU, and wherein the information about the one or more sensors coupled to the second RSU includes information about an energy source type connected to the one or more sensors coupled to the second RSU.

In Example 57, the subject matter of Example 56 optionally includes wherein the information regarding one or more sensors coupled to the RSU and the one or more sensors coupled to the second RSU further includes information about an availability of a low-power wake-up capability of the one or more sensors coupled to the RSU and the one or more sensors coupled to the second RSU.

Example 58 is a roadside unit (RSU) comprising: a processor; and memory coupled to the processor, the memory configured to store instructions that, when executed by processor, cause the processor to execute operations, the operations comprising: receiving multiple input factors corresponding to an environmental condition at a location at which the RSU is located and at least one of a power saving preference for the RSU, a green-energy usage preference for the RSU, a type of energy source connected to the RSU, a quality of service (QoS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source.

In Example 59, the subject matter of Example 58 optionally includes wherein both of the green energy power source and the traditional power source are active and connected to the RSU, and wherein the parameters include: a green energy usage target, wherein the green energy usage target is a percentage of an estimated maximum power consumption of the RSU; and a power consumption reduction target, wherein the power consumption reduction target is a percentage reduction of the estimated maximum power consumption of the RSU.

Example 60 is a system for power management for a roadside unit (RSU), the system comprising: means for receiving multiple input factors corresponding to an environmental condition at a location at which the RSU is located and at least one of a power saving preference for the RSU, a green-energy usage preference for the RSU, a type of energy source connected to the RSU, a quality of service (QoS) requirement, or a capability of the RSU, wherein the capability of the RSU includes at least one operation capable of being performed by the RSU; and means for transmitting a control packet to the RSU, the control packet including parameters to control a mixture of green energy use by the RSU from a green-energy power source and traditional energy use by the RSU from a traditional energy power source.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

It should be understood that the functional units or capabilities described in this specification may have been referred to or labeled as components, circuitry, engines, or modules in order to more particularly emphasize their implementation independence. Such components may be embodied by a variety of hardware-based forms, including hardware that executes program instructions stored in a non-transitory storage medium. For example, a component, circuit, engine, or module may be implemented as a hardware circuit comprising custom very-large-scale integration (VLSI) circuits or gate arrays, off-the-shelf semiconductors such as logic chips, transistors, or other discrete components. A component, circuit, engine, or module may also be implemented in programmable hardware devices such as field programmable gate arrays, programmable array logic, programmable logic devices, or the like. In the case where a component, circuit, engine, or module incorporates and executes program instructions, it should be noted that those instructions may comprise one or more physical or logical blocks of computer instructions, which may, for instance, be organized as an object, procedure, or function. Nevertheless, the program instructions executable as part of a component, circuit, engine, or module need not be physically located together, but may comprise disparate instructions stored in different locations which, when joined logically together, comprise the component or module and achieve the stated purpose for the component, circuit, engine, or module.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for power management for a roadside unit (RSU), the system comprising:

a processor; and memory coupled to the processor, the memory configured to store instructions that, when executed by processor, cause the processor to execute operations, the operations comprising:

receiving multiple input factors corresponding to an environmental condition at a location at which the RSU is located and at least one of a power saving preference for the RSU, a green-energy usage preference for the RSU, a type of energy source connected to the RSU, a quality of service (QOS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source, wherein both of the green energy power source and the traditional power source are active and connected to the RSU, and wherein the parameters include:

a green energy usage target, wherein the green energy usage target is a percentage of an estimated maximum power consumption of the RSU; and a power consumption reduction target, wherein the power consumption reduction target is a reduction of the estimated maximum power consumption of the RSU.

2. The system of claim 1, wherein the green-energy power source includes a solar energy generator or a wind energy generator.

3. The system of claim 2, wherein the solar energy generator or the wind energy generator is connected to the RSU independently from a power grid.

4. The system of claim 1, wherein the traditional power source includes mains power provided from an energy supplier over a power grid.

5. The system of claim 1, wherein the traditional power source is the only active power source connected to the RSU, wherein a particular parameter of the parameters is a power consumption reduction target, and wherein the power consumption reduction target is a percentage reduction of an estimated maximum power consumption of the RSU.

6. The system of claim 5, wherein the memory includes instructions, that when executed by the processor, cause the processor to execute operations comprising:

powering off a component of the RSU;

placing an additional component of the RSU into a low-power state; and disabling a particular operation of the RSU to progress toward the power consumption reduction target.

7. The system of claim 6, wherein powering off of the component of the RSU, the placing of the additional component of the RSU into a low-power state, and the disabling the particular operation is done for a period of time, and wherein the period of time is determined by a machine-learning algorithm to progress toward the power consumption reduction target.

8. The system of claim 1, wherein the memory includes instructions, that when executed by the processor, cause the processor to execute operations comprising:

forming a collaborative group, the collaborative group including the RSU and a second RSU communicatively coupled to the RSU;

determining a power-level demand for the RSU; and responsive to the power-level demand, transferring the at least one operation to the second RSU.

9. A computer implemented method of power management for a roadside unit (RSU), the method comprising:

receiving multiple input factors corresponding to an environmental condition at a location at which the RSU is located and at least one of a power saving preference for the RSU, a green-energy usage preference for the RSU, a type of energy source connected to the RSU, a quality of service (QOS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source, wherein both of the green energy power source and the traditional power source are active and connected to the RSU, and wherein the parameters include:

a green energy usage target, wherein the green energy usage target is a percentage of an estimated maximum power consumption of the RSU; and a power consumption reduction target, wherein the power consumption reduction target is a reduction of the estimated maximum power consumption of the RSU.

10. The method of claim 9, wherein the green-energy power source includes at least one of a solar energy generator or a wind energy generator.

11. The method of claim 10, wherein the solar energy generator or the wind energy generator is directly connected to the RSU.

12. The method of claim 9, wherein the traditional power source is connected to the RSU via an indirect connection.

13. The method of claim 9, further comprising:

forming a collaborative group, the collaborative group including the RSU and a second RSU communicatively coupled to the RSU;

determining a power-level demand for the RSU; and responsive to the power-level demand, transferring the operation to the second RSU.

14. The method of claim 13, wherein the RSU and the second RSU are configurable to transmit respective status information, the respective status information including a current resource usage and at least one of: an available energy source type, a green-energy availability, an environment perception, a compute capability, a communication demand, or a compute demand.

15. The method of claim 14, wherein the current resource usage includes information regarding one or more sensors coupled to the RSU and one or more sensors coupled to the second RSU.

16. The method of claim 15, wherein the information regarding the one or more sensors coupled to the RSU includes information about an energy source type connected to the one or more sensors coupled to the RSU, and wherein the information about the one or more sensors coupled to the second RSU includes information about an energy source type connected to the one or more sensors coupled to the second RSU, and wherein the information regarding the one or more sensors coupled to the RSU and the one or more sensors coupled to the second RSU further includes information about an availability of a low-power wake-up capability of the one or more sensors coupled to the RSU and the one or more sensors coupled to the second RSU.

17. At least one non-transitory machine-readable medium including instructions that, when executed with a processor of a computing device, cause the computing device to perform electronic operations to:

receive multiple input factors corresponding to an environmental condition at a location at which a roadside unit (RSU) is located and at least one of a power saving preference for the RSU, a green-energy usage preference for the RSU, a type of energy source connected to the RSU, a quality of service (QOS) requirement, or a capability of the RSU, wherein the capability of the RSU includes at least one operation capable of being performed by the RSU; and transmit a control packet to the RSU, the control packet including parameters to control a mixture of green energy use by the RSU from a green-energy power source and traditional energy use by the RSU from a traditional energy power source, wherein both of the green energy power source and the traditional power source are active and connected to the RSU, and wherein the parameters include:

a green energy usage target, wherein the green energy usage target is a percentage of an estimated maximum power consumption of the RSU; and a power consumption reduction target, wherein the power consumption reduction target is a reduction of the estimated maximum power consumption of the RSU.

18. The at least one non-transitory machine-readable medium of claim 17, wherein the traditional power source is the only active power source connected to the RSU, wherein a particular parameter of the parameters is a power consumption reduction target, and wherein the power consumption reduction target is a percentage reduction of an estimated maximum power consumption of the RSU.

19. The at least one non-transitory machine-readable medium of claim 18, wherein the instructions further cause the processor to:

power off a component of the RSU;

place an additional component of the RSU into a low-power state; and disable a particular operation of the RSU to progress toward the power consumption reduction target.

20. The at least one non-transitory machine-readable medium of claim 19, wherein at least one of the at least one component or the at least one additional component is a sensor coupled to the RSU, and wherein the sensor is a camera, a Light Detection and Ranging (LIDAR) device, or a Radio Detection and Ranging (RADAR) device.

21. The at least one non-transitory machine-readable medium of claim 19, wherein powering off of the component of the RSU, the placing of the additional component of the RSU into a low-power state, and the disabling the particular operation is done for a period of time, and wherein the period of time determined by a machine-learning algorithm to progress toward the power consumption reduction target.

22. The at least one non-transitory machine-readable medium of claim 17, wherein the instructions further cause the processor to:

form a collaborative group, the collaborative group including the RSU and a second RSU communicatively coupled to the RSU;

determine a power-level demand for the RSU; and responsive to the power-level demand, transfer the at least one operation to the second RSU.

23. The at least one non-transitory machine-readable medium of claim 22, wherein the RSU and the second RSU are configurable to transmit respective status information, the respective status information including a current resource usage and at least one of: an available energy source type, a green-energy availability, an environment perception, a compute capability, a communication demand, or a compute demand, wherein the current resource usage includes information regarding one or more sensors coupled to the RSU and one or more sensors coupled to the second RSU, wherein the information regarding the one or more sensors coupled to the RSU includes information about an energy source type connected to the one or more sensors coupled to the RSU, and wherein the information about the one or more sensors coupled to the second RSU includes information about an energy source type connected to the one or more sensors coupled to the second RSU.

24. A roadside unit (RSU) comprising:

a processor; and memory coupled to the processor, the memory configured to store instructions that, when executed by processor, cause the processor to execute operations, the operations comprising:

receiving multiple input factors corresponding to an environmental condition at a location at which the RSU is located and at least one of a power saving preference for the RSU, a green-energy usage preference for the RSU, a type of energy source connected to the RSU, a quality of service (QOS) requirement, or a capability of the RSU, wherein the capability of the RSU includes at least one operation capable of being performed by the RSU; and transmitting a control packet to the RSU, the control packet including parameters to control a mixture of green energy use by the RSU from a green-energy power source and traditional energy use by the RSU from a traditional energy power source, wherein both of the green energy power source and the traditional power source are active and connected to the RSU, and wherein the parameters include:

a green energy usage target, wherein the green energy usage target is a percentage of an estimated maximum power consumption of the RSU; and a power consumption reduction target, wherein the power consumption reduction target is a reduction of the estimated maximum power consumption of the RSU.

\* \* \* \* \*